United States Patent
Kronrod et al.

(10) Patent No.: US 11,893,252 B1
(45) Date of Patent: Feb. 6, 2024

(54) COALESCING LOGGED OPERATIONS

(71) Applicant: Dell Products L.P., Hopkinton, MA (US)

(72) Inventors: Svetlana Kronrod, Concord, MA (US); Vladimir Shveidel, Pardes-Hana (IL); David Bernard, Westford, MA (US); Vamsi K. Vankamamidi, Hopkinton, MA (US)

(73) Assignee: Dell Products L.P., Hopkinton, MA (US)

( * ) Notice: Subject to any disclaimer, the term of this patent is extended or adjusted under 35 U.S.C. 154(b) by 12 days.

(21) Appl. No.: 17/865,713

(22) Filed: Jul. 15, 2022

(51) Int. Cl.
*G06F 3/06* (2006.01)

(52) U.S. Cl.
CPC ............ *G06F 3/0631* (2013.01); *G06F 3/067* (2013.01); *G06F 3/0656* (2013.01); *G06F 3/0664* (2013.01)

(58) Field of Classification Search
None
See application file for complete search history.

(56) References Cited

U.S. PATENT DOCUMENTS

2020/0272360 A1\* 8/2020 Li .......................... G06F 3/064

OTHER PUBLICATIONS

U.S. Appl. No. 17/151,413, filed Jan. 18, 2021, entitled Data Storage System With Multiple-Size Object Allocator for Disk Cache, to Vladimir Shveidel, et al.

\* cited by examiner

*Primary Examiner* — Brian R Peugh
(74) *Attorney, Agent, or Firm* — Muirhead and Saturnelli, LLC

(57) ABSTRACT

Processing can be performed to persistently record, in a log, a write I/O that writes first data to a target logical address. The processing can include: allocating storage for a first page buffer (PB) located at offsets in a PB pool of non-volatile storage of the log; enqueuing a request to an aggregation queue to persistently store the first data to the first PB of the log, wherein the request identifies the offsets of the PB pool of non-volatile storage which correspond to the first PB; and integrating the request into the aggregation queue. Integrating can include: determining whether a contiguous segment of the offsets of the request is adjacent to a second contiguous segment of the aggregation queue; and responsive to determining the contiguous segment is adjacent to the second contiguous segment, merging the first and second contiguous segments and generating an aggregated continuous segment.

20 Claims, 14 Drawing Sheets

COALESCING LOGGED OPERATIONS

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O (input/output) operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques of the present disclosure can include a computer-implemented method, a system and a non-transitory computer readable medium comprising: receiving a write I/O that writes first data to a target logical address; and responsive to receiving the write I/O, performing first processing to persistently record the write I/O in a log including: allocating storage for a first page buffer (PB) of the log, wherein the first PB is located at one or more offsets in a PB pool of non-volatile storage of the log; enqueuing a first request to an aggregation queue, where the first request is a request to persistently store the first data to the first PB of the log, wherein the first request includes information identifying the one or more offsets of the PB pool of non-volatile storage which correspond to the first PB; and responsive to said enqueuing, integrating the first request into the aggregation queue, wherein said integrating includes: determining whether a first contiguous segment of the one or more offsets of the request is adjacent to a second contiguous segment of offsets of the PB pool, where the second contiguous segment is an existing contiguous segment of the aggregation queue; and responsive to determining the first contiguous segment is adjacent to the second contiguous segment, merging the first contiguous segment and the second contiguous segment and generating an aggregated continuous segment.

In at least one embodiment, integrating can include, responsive to determining the first contiguous segment is not adjacent to any existing contiguous segment of the aggregation queue, adding the first contiguous segment as a new individual contiguous segment to the aggregation queue.

In at least one embodiment, processing can include: aggregating allocated PBs and associated PB pool offsets of a plurality of write I/Os into a plurality of contiguous segments of the aggregation queue; determining, for a first of the plurality of contiguous segments of the aggregation queue, whether the first contiguous segment has an associated size exceeding a maximum aggregation size, or has an associated elapsed time exceeding an aggregation time limit, wherein the first contiguous segment has a first corresponding contiguous range of offsets in the PB pool; and responsive to determining that the first contiguous segment has the associated size exceeding the maximum aggregation size, or has the associated elapsed time exceeding the aggregation time limit, persistently storing content of at least a portion of the plurality of write I/Os having corresponding PB pool offsets included in the first corresponding contiguous range associated with the first contiguous segment. The associated elapsed time of the first contiguous segment can denote an amount of time measured from a starting time corresponding to an earliest arrival or enqueue time with respect to the portion of the plurality of write I/Os having corresponding PB pool offsets located in the first contiguous range of offsets in the PB pool.

In at least one embodiment, the method can be performed in a virtualized data storage system (VDS) using software defined storage (SDS). The VDS can run in a virtualized environment of a cloud service provider. The VDS can be SDS that executes on one or more virtual machines (VMs) hosted on servers using resources within an infrastructure of the cloud service provider. The VDS can receive the write operation from a host, and wherein subsequent to persistently recording the write I/O in the log, processing can include the VDS returning an acknowledgment to the host regarding completion of the write I/O.

In at least one embodiment, processing can include: a PB allocator obtaining a partition of non-volatile storage from the PB pool; the PB allocator receiving a first allocation request to allocate storage for the first PB; and responsive to receiving the first allocation request, the PB allocator allocating the first PB from the partition. The partition can be preallocated and obtained by the PB allocator prior to the PB allocator receiving any allocation requests, including the first allocation request, which are fulfilled using the partition. The aggregation queue can include a plurality of existing contiguous segments, including the second contiguous segment. The plurality of existing contiguous segments can be sorted in accordance with a plurality of associated starting offsets, wherein each of the plurality of existing contiguous segments can have a corresponding one of the plurality of starting offsets denoting a starting offset of a contiguous range of offsets associated with said each existing contiguous segment. A first of the plurality of starting offsets and a first size can denote a first contiguous range of offsets of the first contiguous segment, and wherein determining whether the first contiguous segment is adjacent to the second contiguous segment can use the first starting offset and the first size. A first of the plurality of existing contiguous segments can have an associated contiguous range of offsets of the PB pool, and wherein the associated contiguous range of offsets can be associated with a plurality of allocated PBs for a plurality of write I/Os of a plurality of transactions.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Figure 1:
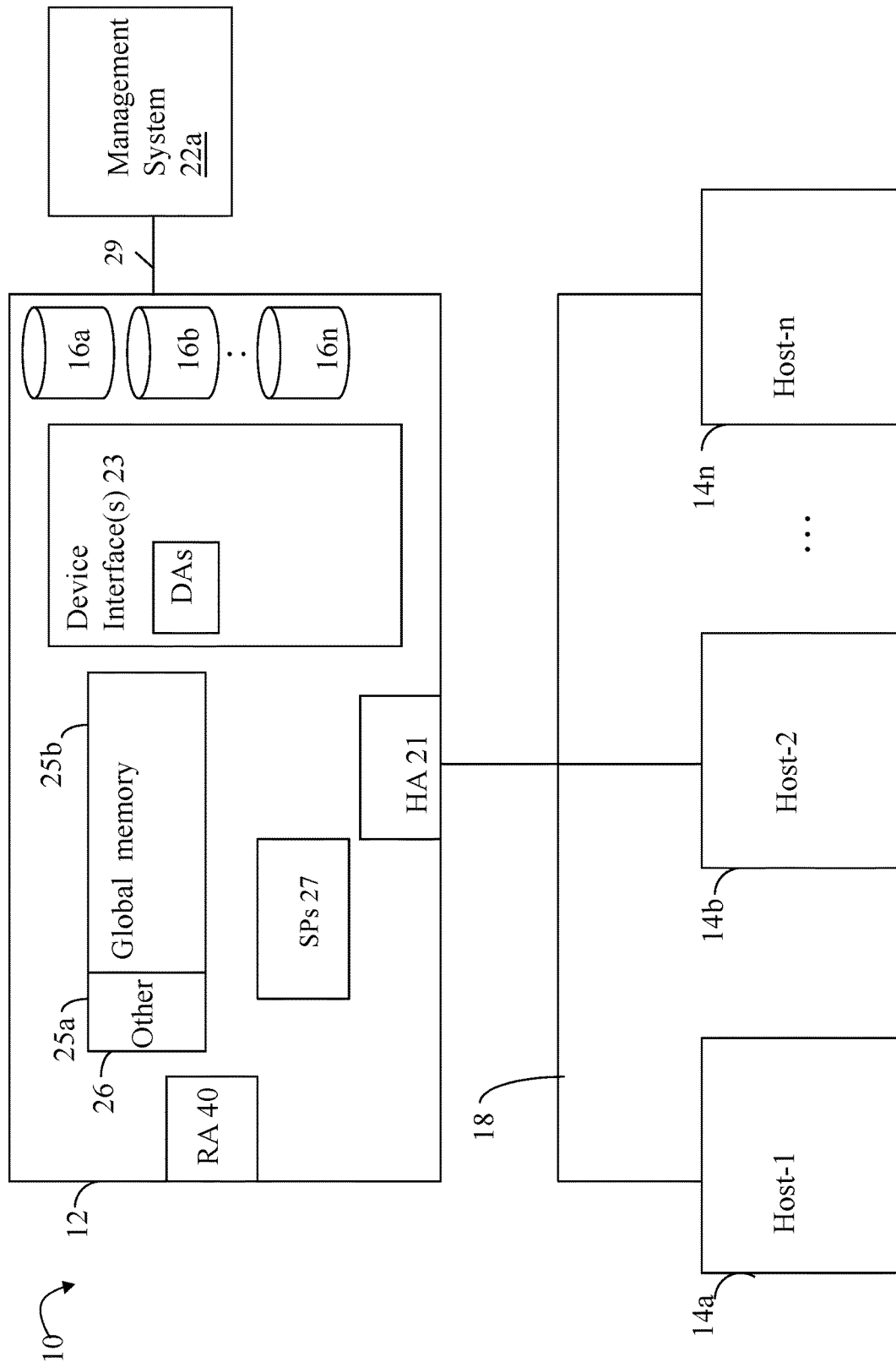
FIG. 1 is an example of components of at least one embodiment of a system in accordance with the techniques of the present disclosure.

A system such as a data storage system can be a log-based system where client or user writes, as well as possibly other operations, can be persistently stored in a log. At a later point in time, entries of the log can be flushed and data written by the logged writes can be further persisted to back-end (BE) or long-term persistent storage.

Although an existing data storage customer may have a physical data storage system or appliance located at a physical site or premises of the data storage customer, the data storage customer may want to extend their current on-site physical data storage system environment to the cloud. In particular, the data storage customer may desire a virtual storage appliance (VSA) or virtual data storage system (VDS) implemented using software defined storage (SDS), where the VSA or VDS runs in a virtualized environment of a cloud provider. The VSA or VDS can be SDS that executes on one or more virtual machines (VMs) hosted on servers using resources within a cloud service provider's infrastructure.

The VDS or VSA can generally implement a hardware-based data storage system and its services using software that executes in the virtualized environment of the cloud service provider using resources of the cloud service provider's infrastructure. The VDS or VSA can provide services such as, for example, data compression, replication, snapshots, deduplication, control path command processing, I/O or data path command processing, and the like, as typically provided by a physical data storage system. Thus, for example, the VDS or VSA executes on one or more VMs and utilizes computer processors, memory, non-volatile storage, and other resources of the cloud service provider.

In at least one embodiment, the VDS or VSA can be a log-based system which records client or user operations, such as write I/Os, to a log stored on non-volatile storage. In a cloud environment where the VDS or VSA executes in the virtualized environment of the cloud service provider, the log can be implemented using non-volatile block level storage volumes of the cloud service provider. In at least one cloud service provider's infrastructure, a block level storage volume can be used as a storage resource for the log storing logged or recorded user operations such as user or client write I/Os. A first type of the block level storage volume of the cloud service provider can be specifically optimized for latency sensitive workloads. More generally, the cloud service provider can offer different volume types of block storage where each of the different types can vary in terms of performance and cost characteristics. The first type of block level storage volume can be optimized to deliver high performance for I/O intensive workloads that rely on consistent and fast response times. The log of the VDS or VSA can be implemented using one or more block level storage volumes of the first type of the cloud service provider.

The cloud service provider can have a charge model for the first type of block level storage volume optimized for I/O intensive latency sensitive workloads, where the charge model can be based on one or more pricing parameters including the number of IOPS (I/Os per second). The storage customer deploying the VDA or VSA in the cloud service provider's infrastructure can incur charges for the log based on the measured IOPS directed to the log configured on the first type of block level storage volume. In at least one existing system, each logged client or user write I/O can result in two backend write I/Os to the log, where the log is implemented as the first type of block level storage volume. Thus, it can be desirable for the VDA or VSA to reduce the number of backend I/Os to the underlying first type of block level storage volume in order to reduce the costs incurred by the storage customer deploying the VDA or VSA in the cloud service provider environment.

Generally, storage systems must persist data related to client or user (e.g., host) write I/Os prior to acknowledging the I/O request to the host. The persisted data related to the client write I/O can be recorded in the log noted above to prevent data loss in case of a system failure or other event. As noted above, the log can be used to record the write I/O data and a related descriptor to a fast and easily accessible intermediate media, which allows shorter response time to the host. The recorded data of the write I/O as stored in the log can be subsequently flushed to other longer term non-volatile storage. While systems typically flush data written to the longer term (main) non-volatile storage in bulk aggregating data from multiple write I/Os, logging handles each individual I/O request as received from the host or other client. Thus, recording entries in the log for user operations such as write I/Os normally includes a large number of smaller sized I/Os to the backend storage. In a cloud environment using the VSA or VDS, both the longer term (main) non-volatile storage and the first type of block level storage used for the log reside on the cloud provider's back-end storage. In connection with the foregoing, journaling or recording entries for the client operations, including write operations, is a significant contributor to the cost incurred to the large number of IOPS.

Accordingly, described in the following paragraphs are techniques that can be used to decrease the number of I/O operations performed in connection with logging user or client operations. In at least one embodiment, the techniques of the present disclosure provide for reducing the number of I/O operations to the log in connection with recording or journaling client write I/O operations to the log. The techniques of the present disclosure provide for coalescing multiple journaling operations, and performing single buffer writes of aggregated data to the log. In at least one embodiment, the log can be implemented using backend non-volatile storage resources of a cloud provider environment where the techniques of the present disclosure provide for reducing the IOPS, and associated costs, with respect to the log.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 can be connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, also be located in different physical locations. The communication medium 18 used for communication between the host systems 14a-14n and the data storage system 12 of the system 10 can use a variety of different communication protocols such as block-based protocols (e.g., SCSI, Fibre Channel, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques of the present disclosure. It should also be noted that an embodiment can include data storage arrays or other components from one or more vendors.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs can refer to solid state electronics devices as distinguished from electromechanical devices, such as hard drives, having moving parts. Flash devices or flash memory-based SSDs are one type of SSD that contains no moving mechanical parts. The flash devices can be constructed, for example, using nonvolatile semiconductor NAND flash memory.

The data storage system can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage system can include one or more RAs used, for example, to facilitate communications between data storage systems. The data storage system can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage system. In one embodiment, the device interfaces 23 can perform data operations using a system cache that can be included in the global memory 25b, for example, when communicating with other device interfaces and other components of the data storage system. The other portion 25a is that portion of the memory that can be used in connection with other designations that vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 can also provide data to the host systems 14a-n also through the channels. The host systems 14a-n do not address the drives or devices 16a-16n of the storage systems directly, but rather access to data can be provided to one or more host systems from what the host systems view as a plurality of logical devices, logical volumes (LVs) which can also referred to herein as volumes or logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage referenced by such logical unit numbers. The LUNs may or may not correspond to the actual or physical disk drives or more generally physical storage devices. For example, one or more LUNs can reside on a single physical disk drive, data of a single LUN can reside on multiple different physical devices, and the like. Data in a single data storage system can be accessed by multiple hosts allowing the hosts to share the data residing therein. The HAs can be used in connection with communications between a data storage system and a host system. The RAs can be used in facilitating communications between two data storage systems. The DAs can include one or more type of device interface used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques of the present disclosure, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques of the present disclosure can be be made with respect to a physical data storage system and its physical components (e.g., physical hardware for each HA, DA, HA port and the like), the techniques of the present disclosure can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a can be a computer system which includes data storage system management software or application executing in a web browser. A data storage system manager can, for example, view information about a current data storage configuration such as LUNs, groups of LUNs, and the like, on a user interface (UI) in a display device of the management system 22a. Alternatively, and more generally, the management software can execute on any suitable processor in any suitable system. For example, the data storage system management software can execute on a processor of the data storage system 12.

In some embodiments, each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target logical address from which data is read from, or written to, depending on whether the I/O operation is, respectively, a read or a write operation request. The target logical address of the received I/O operation can be expressed in terms of a LUN or volume and logical address or offset location (e.g., LBA or logical block address) on the LUN. Processing can be performed on the data storage system to further map the target logical address of the received I/O operation, expressed in terms of a LUN and logical address or offset location on the LUN, to its corresponding physical storage device (PD) and location on the PD. The DA which services the particular PD can further perform processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system that includes multiple storage processors (SPs). Each of the SPs 27 can y be a CPU including one or more "cores" or processors and each can have their own memory used for communication between the different front end and back end components rather than utilize a global memory accessible to all storage processors. In such embodiments, the memory 26 can represent memory of each such storage processor.

Generally, the techniques of the present disclosure can be used in connection with any suitable storage system, appliance, device, and the like, in which data is stored.

The data path or I/O path can be characterized as the path or flow of I/O data through a system. For example, the data or I/O path is the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12.

The data path and control path define two sets of different logical flow paths. In at least some of the data storage system configurations, at least part of the hardware and network connections used for each of the data path and control path can differ. For example, although both control path and data path generally use a network for communications, some of the hardware and software used can differ. For example, with reference to the FIG. 1, a data storage system can have a separate physical connection 29 from a management system 22a to the data storage system 12 being managed whereby control commands are issued over such a physical connection 29. However, user I/O commands may never be issued over such a physical connection 29 provided solely for purposes of connecting the management system to the data storage system. In any case, the data path and control path each define two separate logical flow paths.

Figure 2:
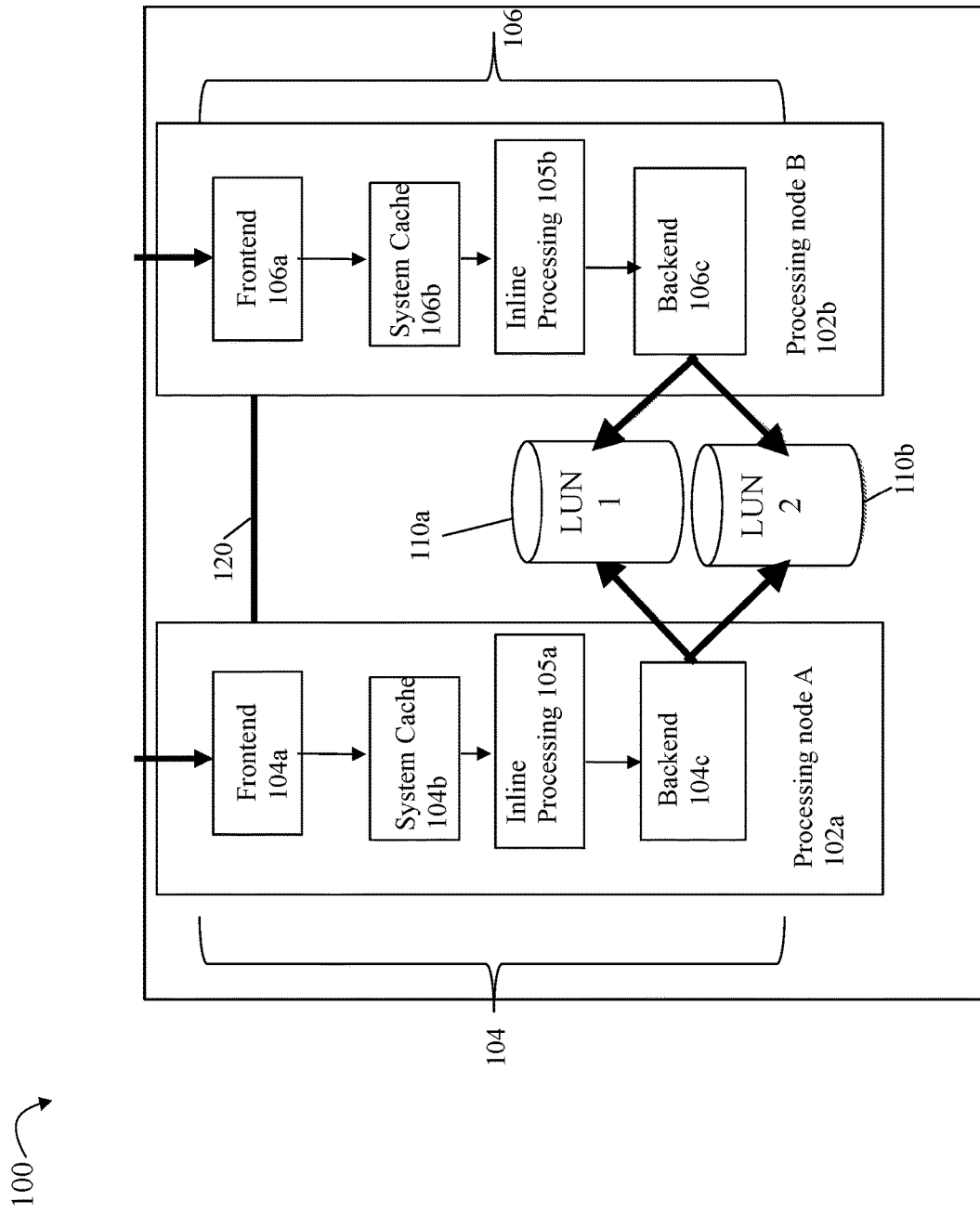
FIG. 2 is an example illustrating the I/O path or data path in connection with processing data in an embodiment in accordance with the techniques of the present disclosure.

With reference to the FIG. 2, shown is an example 100 illustrating components that included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O is be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is referred to herein as an active-active configuration.

In connection with a write operation received from a host, or other external client, and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Thus, in such an embodiment, rather than have dedicated hardware for an FA, DA, and the like, the components described above for the FA, DA, RA, and the like, can be viewed as logical or functional components where the tasks of such components can be implemented by code executed by processors of the nodes as illustrated in FIG. 2. Each node of the pair can include its own resources such as its own local (i.e., used only by the node) resources such as local processor(s), local memory, and the like.

Consistent with other discussion herein, a cache can be used for caching write I/O data and other cached information. The other cached information can include, for example, cached operations or commands such as create snapshot commands. In one system, the cache can be implemented using multiple caching devices or PDs, such as non-volatile (NV) SSDs such as NVRAM devices that are external with respect to both of the nodes or storage controllers. The caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein.

In the following paragraphs, the one or more caching devices or PDs provides a persistent cache that can be referred to as a data journal, log or log tier used in the data storage system. In such a system, the caching devices or PDs are non-volatile log devices or PDs upon which the log is persistently stored. In at least one embodiment, in addition to such a persistently stored log, one or more of the nodes can also include node-local in-memory copies of information of the log. In at least one embodiment, the node-local in-memory copies of information of the log stored on each node can be stored in volatile memory, such as a RAM, that is local to the node and can be accessed only within the node. For example, a process or thread of code executing on a core or processor of the node can access for reading and/or writing the RAM or other volatile memory that is local to the node.

In a data storage system, minimizing the latency of I/O requests is a critical performance metric. In at least one data storage system using the dual node architecture such as described in connection with FIG. 2, for write operations, latency is determined by the amount of time taken to store the write data in the log where the write data is visible to both nodes or controllers of the system.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 3:
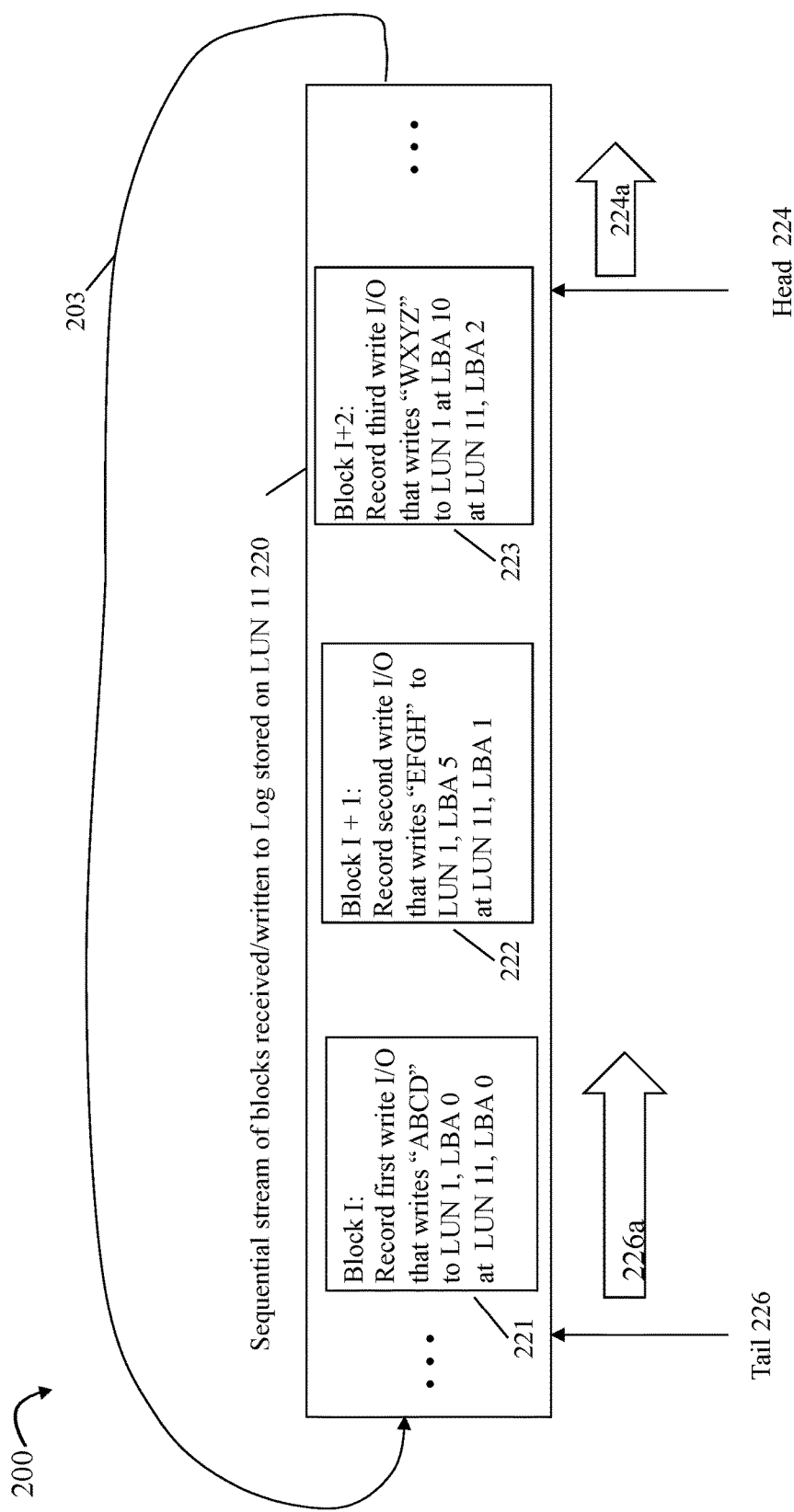
FIGS. 3, 4 and 5 are examples illustrating use of a log structured system in an embodiment in accordance with the techniques of the present disclosure.

Referring to FIG. 3, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 3, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 4:
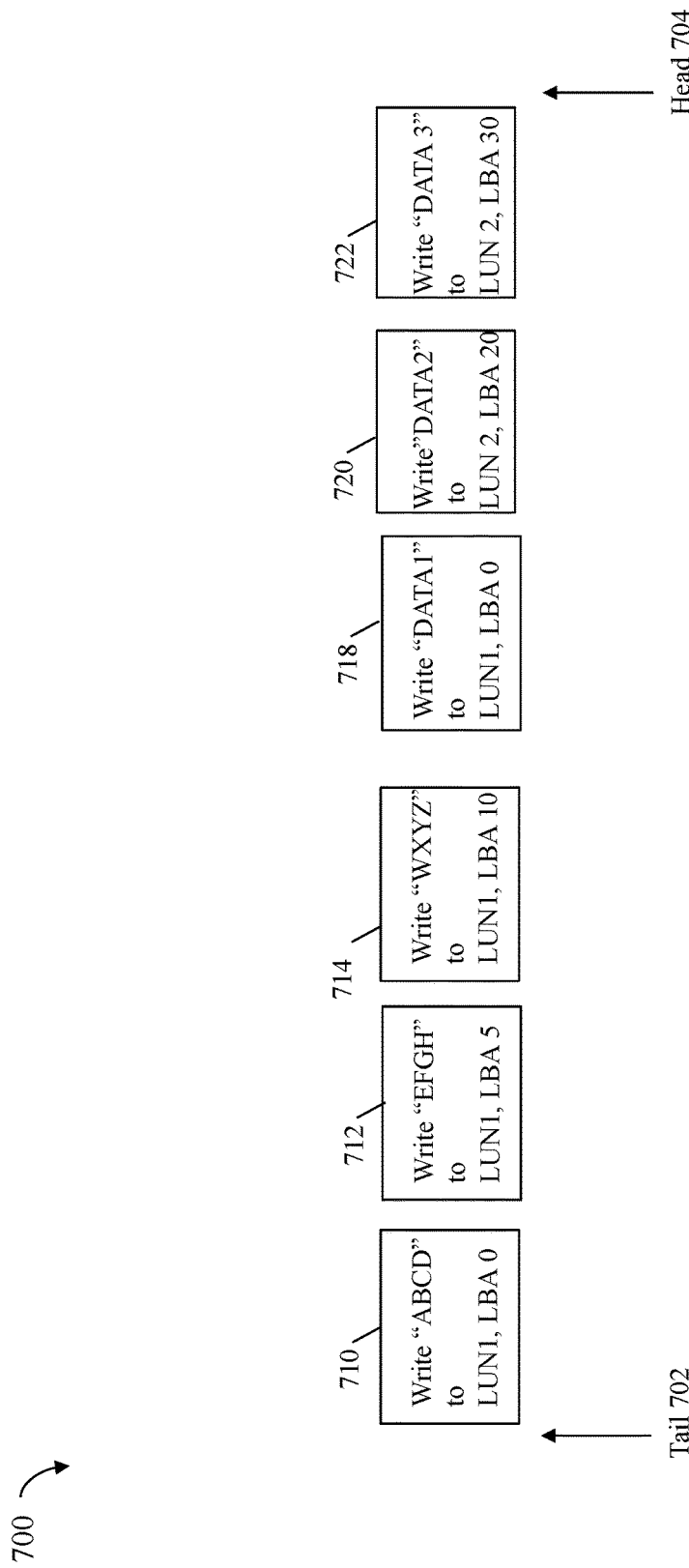

Referring to FIG. 4, shown is an example of information that can be included in a log in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 4, the log records 710, 712, 714, 718, 720 and 722 can also record the write data (e.g., write I/O operation payload) written by the write operations. It should be noted that the log records 710, 712 and 714 of FIG. 4 correspond respectively to the log records 221, 222 and 223 of FIG. 3.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 5:
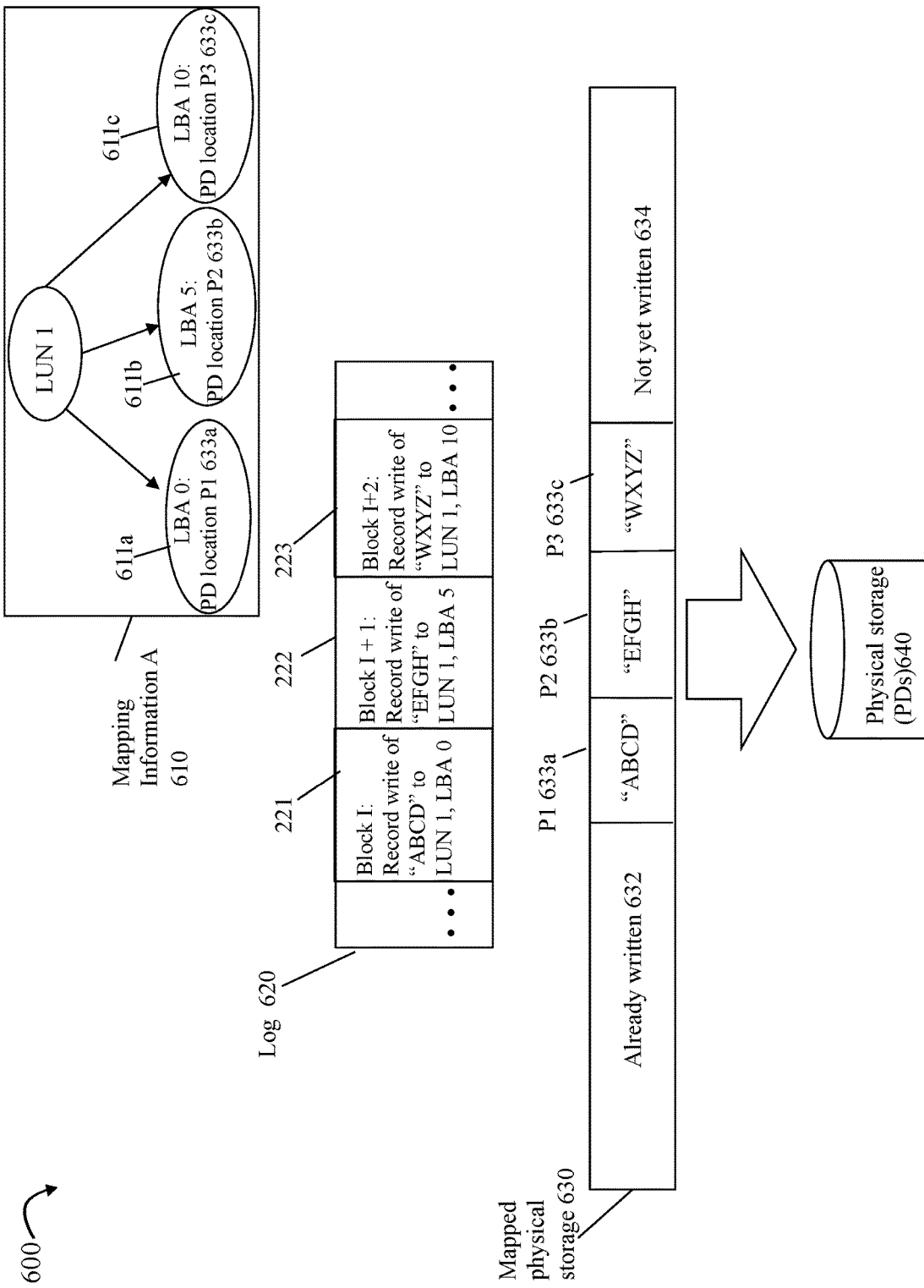

Referring to FIG. 5, shown is an example 600 illustrating the flushing of logged writes and the physical data layout of user data on BE PDs in at least one embodiment in accordance with the techniques of the present disclosure. FIG. 5 includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611*a-c* denoting the mapping information, respectively, for the 3 target logical address of the 3 recorded write I/O operations in the log records 221, 222, and 223. The element 611*a* of the mapping information denotes the mapping information for the target logical address LUN1, LBA 0 of the block 221 of the log 620. In particular, the block 221 and mapping information 611*a* indicate that the user data "ABCD" written to LUN 1, LBA 0 is stored at the physical location (PD location) P1 633*a* on the physical storage 640. The element 611*b* of the mapping information denotes the mapping information for the target logical address LUN1, LBA 5 of the block 222 of the log 620. In particular, the block 222 and mapping information 611*b* indicate that the user data "EFGH" written to LUN 1, LBA 5 is stored at the physical location (PD location) P2 633*b* on the physical storage 640. The element 611*c* of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633*c* on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 3) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633*a*, 633*b*, 633*c* and 634. The element 632 denotes the physical locations of the user data written and stored on the BE PDs for the log records processed prior to the block or record 221. The element 633*a* denotes the PD location P1 of the user data "ABCD" stored at LUN 1, LBA 1. The element 633*b* denotes the PD location P2 of the user data "EFGH" stored at LUN 1, LBA 5. The element 633*c* denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information. With a log-structured system as discussed herein, recorded writes in the log are processed as corresponding entries are flushed from the log, where the data written by the writes (as recorded in the log) is stored at new physical storage locations on the BE PDs.

Although an existing data storage customer may have a physical data storage system or appliance located at a physical site or premises of the data storage customer, the data storage customer may want to extend their current on-site physical data storage system environment to the cloud. In particular, the data storage customer may desire a virtual storage appliance (VSA) or virtual data storage system (VDS) implemented using software defined storage (SDS), where the VSA or VDS runs in a virtualized environment of a cloud provider. The VSA or VDS can be SDS that executes on one or more virtual machines (VMs) hosted on servers using resources within a cloud service provider's infrastructure.

The VDS or VSA can generally implement a hardware-based data storage system and its services using software that executes in the virtualized environment of the cloud service provider using resources of the cloud service provider's infrastructure. The VDS or VSA can provide services such as, for example, data compression, replication, snapshots, deduplication, control path command processing, I/O or data path command processing, and the like, as typically provided by a physical data storage system. Thus, for example, the VDS or VSA executes on one or more VMs and utilizes computer processors, memory, non-volatile storage, and other resources of the cloud service provider.

In at least one embodiment, the VDS or VSA can be a log-based system which records client or user operations, such as write I/Os, to a log stored on non-volatile storage. In a cloud environment where the VDS or VSA executes in the virtualized environment of the cloud service provider, the log can be implemented using non-volatile block level storage volumes of the cloud service provider. In at least one cloud service provider's infrastructure, a block level storage volume can be used as a storage resource for the log storing logged or recorded user operations such as user or client write I/Os. A first type of the block level storage volume of the cloud service provider can be specifically optimized for latency sensitive workloads. More generally, the cloud service provider can offer different volume types of block storage where each of the different types can vary in terms of performance and cost characteristics. The first type of block level storage volume can be optimized to deliver high performance for I/O intensive workloads that rely on consistent and fast response times. The log of the VDS or VSA can be implemented using one or more block level storage volumes of the first type of the cloud service provider.

The cloud service provider can have a charge model for the first type of block level storage volume optimized for I/O intensive latency sensitive workloads, where the charge model can be based on one or more pricing parameters including the number of IOPS (I/Os per second). The storage customer deploying the VDA or VSA in the cloud service provider's infrastructure can incur charges for the log based on the measured IOPS directed to the log configured on the first type of block level storage volume. In at least existing system, each logged client or user write I/O can result in two backend write I/Os to the log, where the log is implemented as the first type of block level storage volume. Thus, it can be desirable for the VDA or VSA to reduce the number of backend I/Os to the underlying first type of block level storage volume in order to reduce the costs incurred by the storage customer deploying the VDA or VSA in the cloud service provider environment.

Generally, storage systems must persist data related to client or user (e.g., host) write I/Os prior to acknowledging the I/O request to the host. The persisted data related to the client write I/O can be recorded in the log noted above to prevent data loss in case of a system failure or other event that. As noted above, the log can be used to record the write I/O data and a related descriptor to a fast and easily accessible intermediate media, which allows shorter response time to the host. The recorded data of the write I/O as stored in the log can be subsequently flushed to other longer term non-volatile storage. While systems typically flush data written to the longer term (main) non-volatile storage in bulk aggregating data from multiple writes I/Os, logging handles each individual I/O request as received from host or other client. Thus, recording entries in the log for user operations such as write I/Os normally includes a large number of smaller sized I/Os to the backend storage. In a cloud environment using the VSA or VDS, both the longer term (main) non-volatile storage and the first type of block level storage used for the log reside on the cloud provider's back-end storage. In connection with the foregoing, journaling or recording entries for the client operations, including write operations, is a significant contributor to the cost incurred to the large number of IOPS.

Accordingly, described in the following paragraphs are techniques that can be used to decrease the number of I/O operations performed in connection with logging user or client operations. In at least one embodiment, the techniques of the present disclosure provide for reducing the number of I/O operations to the log in connection with recording or journaling client write I/O operations to the log. The techniques of the present disclosure provide for coalescing multiple journaling operations, and performing single buffer writes of aggregated data to the log. In at least one embodiment, the log can be implemented using backend non-volatile storage resources of a cloud provider environment where the techniques of the present disclosure provide for reducing the IOPS, and associated costs, with respect to the log.

The foregoing and other aspects of the techniques of the present disclosure are described in more detail in illustrative examples in the following paragraphs.

In some embodiments in accordance with the techniques of the present disclosure, write operations can be recorded in the log using different object types or structures. A first structure of the log can include records of the data written by the received write operations, and a second structure of the log can include records that are descriptors for the received write operations. For example, the write operation data or payload can be stored in a record of the first structure in the log. Additionally, a descriptor for the write operation can be stored in a record of the second structure in the log, where the descriptor can reference a record in the first structure including the write data written by the write operation. In at least one embodiment, the foregoing first structure recording the write data payload can be generally a pool of data buffers; and the second structure of descriptors can be a ring buffer. A ring buffer is generally known in the art. A ring buffer is a ring of records or entries. The ring buffer can be maintained using pointers, such as a head pointer and a tail pointer, where new entries of the ring can be allocated from the head and space reclamation can be done from the tail. When an entry at the tail is flushed, the entry can be freed and thus reclaimed for reuse. The tail can be advanced as entries are flushed. In a similar manner, as entries are allocated, the head pointer is advanced. Although particular structures, such as a ring buffer, are described herein, more generally, any suitable structure and/or organization can be utilized with the techniques of the present disclosure.

Figure 6:
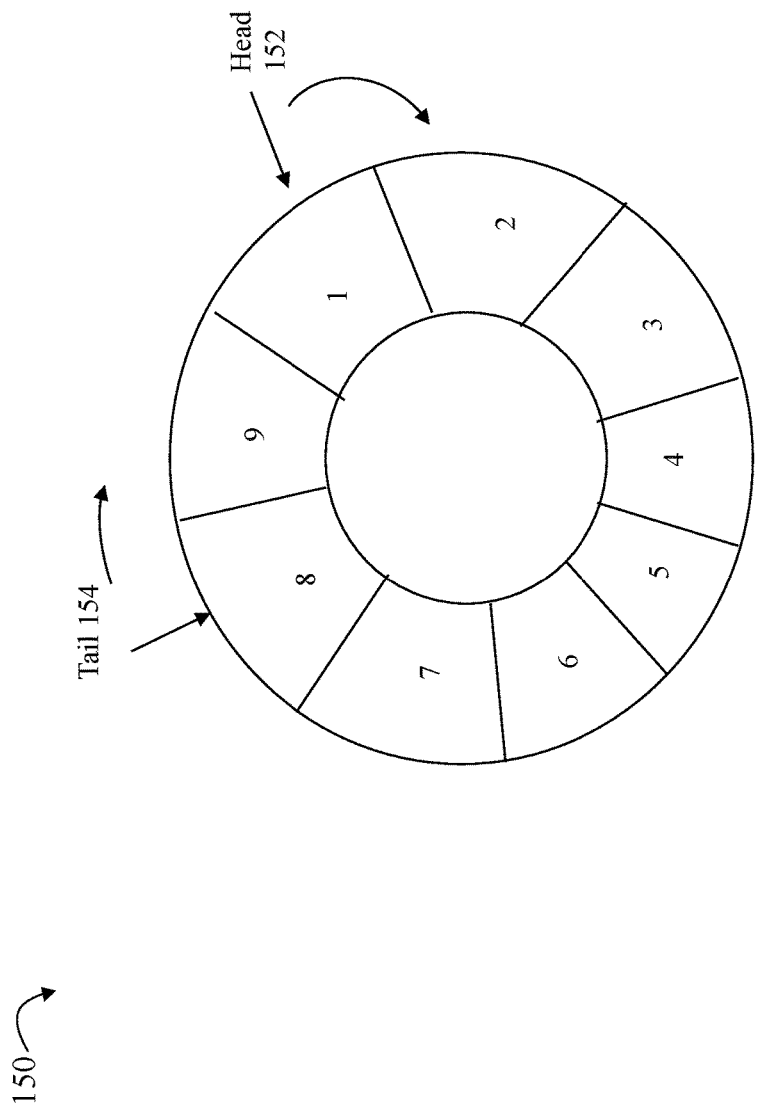
FIG. 6 is an example of a ring buffer structure that can be used in at least one embodiment in accordance with the techniques of the present disclosure.

Referring to FIG. 6, shown is an example 150 illustrating a ring buffer. The ring buffer 150 can be managed using the head pointer 152 and the tail pointer 154. Both pointers are advanced in the clockwise flow in this example. Entries are allocated from the head of the list as denoted by the head pointer 152. For example, the entry 1 can be allocated by the head pointer 152. Subsequently, the head pointer 152 is advanced to the entry 2 since entry 2 is the next entry to be allocated when needed. The tail pointer 154 can denote the entry in the ring buffer that is to be flushed next or is currently being flushed. For example, the tail pointer 154 is currently pointing to entry 8. Once entry 8 is flushed, the tail pointer 154 is advanced to entry 9 that is flushed. The ring buffer allocates new entries in a FIFO (first in first out) manner from the head pointer based on the sequential positioning in the buffer as denoted by the entry numbers 1 through 9. In at least one embodiment for ring buffer management, both the "full" and "empty" cases of the ring buffer can look the same where the head pointer 152 and the tail pointer are equal or point to the same entry in the ring buffer. In the full case, all entries in the ring buffer are allocated and in the empty case, all entries in the ring buffer are free or available for use. Any suitable technique can be used to distinguish between the full and empty ring buffer cases when the head pointer and the tail pointer point to the same entry. For example, a count can be maintained for the ring buffer denoting the number of allocated entries. The count can be initialized to 0, incremented each time an entry is allocated by the head pointer advancing, and decremented each time an entry is flushed and reclaimed by advancing the tail pointer.

In at least one embodiment, the ring buffer can be implemented using an array where, for example, the entries 1 through 9 as in FIG. 6 correspond to array indices. The circular nature of the ring buffer can be implemented using the linear array by considering the sequential array indices as if connected end to end or as a contiguous sequential array of elements. Once the head or tail pointer reaches entry 9, the head or tail pointer continues with the next entry in the sequence which is entry 1. In this manner the entries or indices of the linear array form a logical loop or ring as illustrated in the FIG. 6.

In at least one embodiment, the first structure of logged data can be a pool of page buffers (PBs) where each PB includes the write data of a single logged write I/O operation. The second structure of logged descriptors can be implemented as a ring buffer of page descriptors (PDESCs) where each PDESC includes a descriptor of a single logged request such as a write operation. For a write operation that writes data, the logged write operation can be described by a PDESC of the log, the content or data written can be stored in a PB of the log, and the PDESC of the log can include a reference (e.g., address or pointer) to the PB containing the data written. In some systems, requests or operations in addition to write operations can be recorded in the log using PDESCs where such PDESCs of these additional requests or operations may not have an associated PB.

In at least one embodiment where the PBs are implemented using a pool of PBs, the PBs can be organized and maintained as a pool while the PDESCs can be organized and maintained as a ring buffer.

In at least one embodiment, the PDESC ring or ring buffer can be implemented as an array or linked list where each PDESC entry in the ring buffer can have an associated sequence number or identifier. Unique monotonically increasing sequence numbers or identifiers can be assigned to PDESC entries as they are used to log operations, such as write operations. The sequence numbers can denote the time dependent ordering of the logged operations or requests. A PDESC that generally references a PB can be referred to as a PDESC-PB pair where the PB of the pair contains the content stored at the logical address included in the PDESC of the pair.

In an embodiment in accordance with the techniques of the present disclosure for purposes of data integrity and correctness, the time order dependency of the logged data and operations of the log needs to be maintained. The time order is with respect to the relative order in which the operations are to be applied to the stored data of the data storage system to ensure data integrity and correctness. In an active-active system where I/Os can be serviced by both nodes of the dual node system, the time order dependency requirement needs to be maintained and synchronized across both nodes of the system. For example, at a first point in time, the node A can process a first write that is acknowledged to the host as completed. The first write can write first data to a first logical address, where the first write is stored in the log and subsequently flushed to the BE PDs. At a second point in time subsequent to the first point in time, the node A can process a second write that is acknowledged to the host as completed. The second write can write second data to the first logical address where the second write is also stored in the log and subsequently flushed to the BE PDs. When flushing the logged first data of the first write and the logged second data of the second write, the time order dependency or requirement is that the second data of the second write needs to be stored to the physical storage containing the data for the first logical address after the first data in order to ensure that the actual physical storage contains the correct data expected by the host based on the order in which the first and second writes were acknowledged to the host as being applied to the first logical address. Since the second write is acknowledged as successfully complete subsequent to the successful acknowledgement of the first write, the host expects the first logical address to contain the second data written (or overwritten) by the second subsequent write. In at least one system, the time order of logged data and operations can be denoted using global sequence numbers or IDs. Any optimizations performed such as, for example, in connection with parallel flushing must maintain the same resulting data content as described by the time order dependency denoting the logical ordering in which the logged requests or operations are applied.

In one such dual node system in accordance with the techniques of the present disclosure, one of the two nodes can be designated as the primary node which assigns each logged operation a new unique sequence ID. The sequence ID of the logged requests or operations denote the time dependent order in which such logged requests or operations are logically applied to the stored data on the BE PDs in order to maintain the data integrity and data content and expected by the host or other clients. The order in which the data is flushed from the log to the BE PDs maintains the time order requirement or dependency as denoted by the sequence IDs.

In one dual node system in at least one embodiment in accordance with the techniques of the present disclosure, the log can include page buffers or PBs and page descriptors or PDESCs as mentioned above. Each write I/O that writes data to a target logical address can have its associated write data stored in the log using a PB and a PDESC. The write data is stored in a PB and the PDESC references or points to the PB containing the write data. The PDESC can generally include other information regarding the write I/O such as, for example, the target logical address (e.g., LUN and LBA or offset) of the recorded write I/O, the sequence ID, a pointer (ptr) or reference to the PB including the write data associated with the PDESC (e.g., where the write data is written by the write I/O recorded in the log as the PDESC and the referenced PB containing the write data), and other information such as flags associated with the logged operation or request.

In at least one embodiment, each logged write operation can be represented by a PDESC-PB pair of the log.

Figure 7:
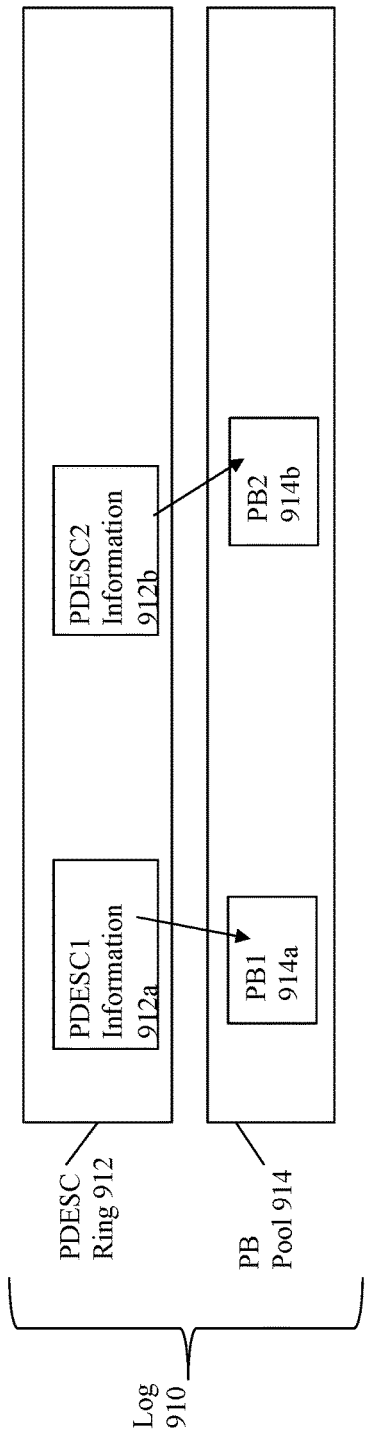
FIG. 7 is an example illustrating content of a log used for persistently recording write I/O operations in at least one embodiment in accordance with the techniques of the present disclosure.

Referring to FIG. 7, shown is an example 900 illustrating in more detail the various structures of a log in at least one embodiment in accordance with the techniques of the present disclosure. The example 900 includes the log 910. The log 910 can be persistent non-volatile storage used for logging user or client operations such as, for example, logging the write I/Os. The log 910 includes the PDESC ring 912 of persistently stored PDESCs, and the PB pool 914 of persistently stored PBs. Illustrated in the example 900, a first write I/O that writes first content is recorded in the log 910 using the PDESC-PB pair 912a-914a, where the PDESC 912a references or points to the PB 914a storing the first content. Additionally, a second write I/O that writes second content is recorded in the log 910 using the PDESC-PB pair 912b-914b, where the PDESC 912b references or points to the PB 914b storing the second content. More generally, the log 910 can include more than the two PDESC-PB pairs of the example 900 provided for illustration purposes.

Figure 8:
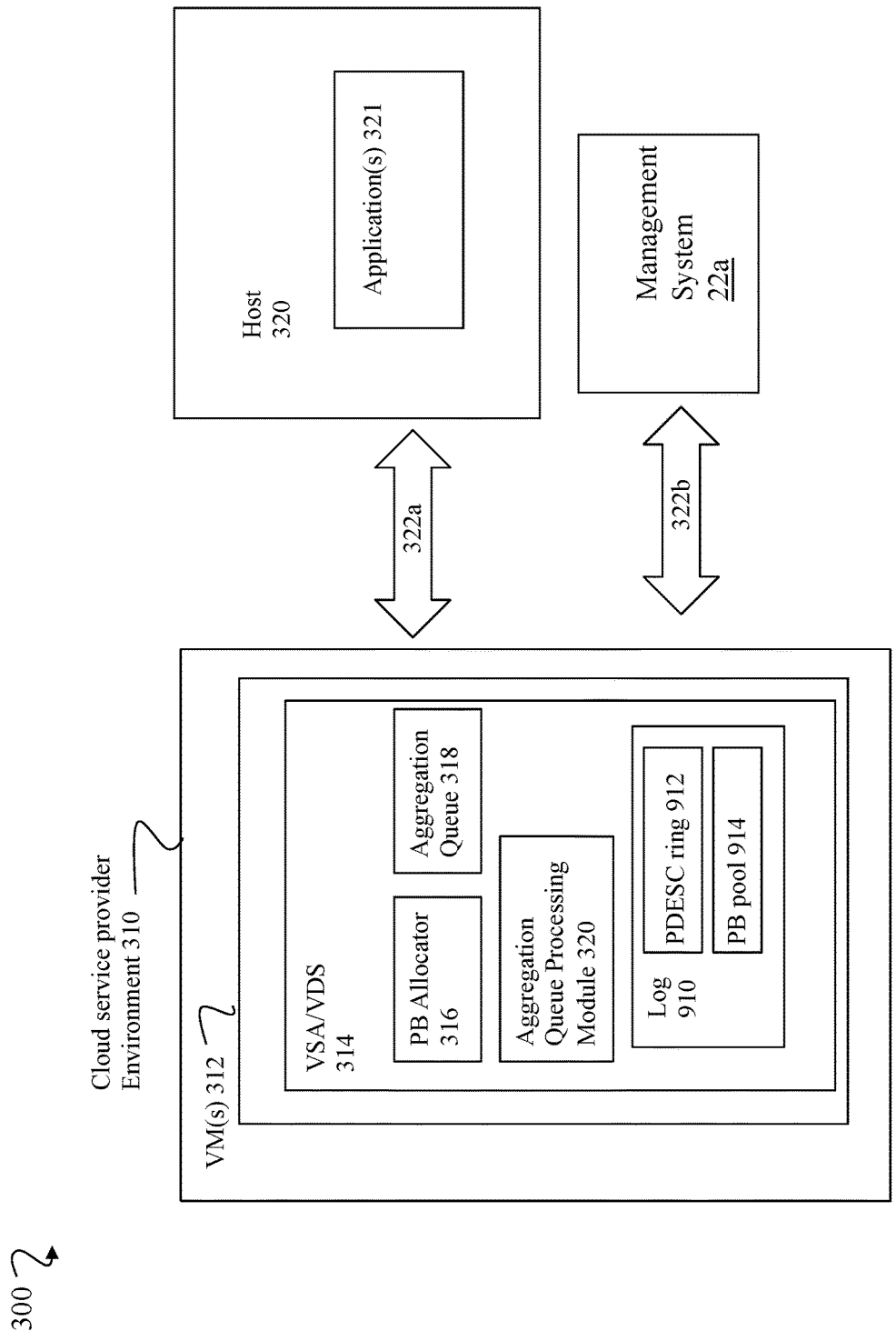
FIG. 8 is an example illustrating components that can be used in a system with a virtualized data storage system or storage appliance in at least one embodiment in accordance with the techniques of the present disclosure.

Referring to FIG. 8, shown is an example 300 illustrating components that can be included in at least one embodiment in accordance with the techniques of the present disclosure. The example 300 includes a cloud service provider environment 310 where the VSA or VDS 314 can be deployed as SDS on one or more VMs 312. A host 320 and the VSA or VDS 314 can communicate with each other over the connection 322a. The connection 322a can represent a network or other communication connection or communication medium similar, for example, to the element 18 of FIG. 1. One or more applications 321 can execute on the host 320, where the one or more applications 321 can issue I/Os and other commands or requests to the VDS 314 over the connection 322a. The host 320 can be similar to the other hosts described herein such as the hosts 14a-n of FIG. 1.

The VDS 314 can perform data services and processing as described herein for a physical data storage system or appliance that is not a virtualized or not SDS. The VDS 314 can include the log 910, a PB allocator 316, an aggregation queue 318, and an aggregation queue processing module 320. The log 910 can generally denote the log of recorded client or user operations, such as write I/Os from the host 320. The log 910 of FIG. 8 can represent the log, for example, described in connection with FIG. 7 and elsewhere herein. The PB allocator 318 and aggregation queue processing module 320 can generally denote code executing on the VM(s) 312 that perform processing to implement techniques of the present disclosure described in more detail in the following paragraphs. The aggregation queue 318 can generally denote one or more data structures used by the aggregation queue processing module 320 to implement techniques of the present disclosure described in more detail in the following paragraphs.

The management system 22a can be used, for example, by a data storage administrator or manager of the customer's VDS 314. The system 22a can be as described, for example, in connection with FIG. 1. The management system 22a and the VSA or VDS 314 can communicate with each over the connection 322b. The connection 322b can represent a network or other communication connection or communication medium similar, for example, to the element 18 of FIG. 1. In operation, for example, the data storage administrator can issue commands from the management system 22a to the VDS 314 over the connection 322b, where such commands can include control path or management commands. For example, the data storage administrator can issue one or more commands to provision or create one or more LUNs for storing user or client data of the host 320. The one or more LUNs can have associated non-volatile physical storage serving as BE PDs for the one or more LUNs, where the non-volatile physical storage can be provisioned from storage resources of the cloud service provider environment 310.

Subsequent to provisioning physical storage for one or more LUNs storing client data of the host 320, the host 320 can issue write I/Os directed to the one or more LUNs. The host 320 can issue write I/Os over the connection 322a to the VDS 314, where such write I/Os are directed to target logical addresses on the one or more LUNs and where such write I/Os can be recorded in the log 910 by the VDS 314 in accordance with the techniques of the present disclosure described in more detail elsewhere herein. Subsequent to logging the write I/Os in the log 910, the VDS 314 can return corresponding acknowledgements to the host 320. In particular and consistent with other discussion herein, an acknowledgement can be returned for host 320 in response to a write I/O after the write I/O has been recorded in the log 910 by the VDS 314. Additionally, subsequent to recording the write I/O in the log 910, the recorded write I/O can be flushed from the log 910, where the write data written by the write I/O can be destaged and stored at a backend storage location on non-volatile physical storage. Consistent with other discussion herein, the backend storage location storing the write data of the write I/O in at least one embodiment using the VDS 314 in a cloud service provider environment can be located on storage resources of the cloud service provider environment 310. In at least one embodiment, a write I/O can be recorded in the log 910 as a PDESC-PB pair of the log 910. Additionally, the PBs and PDESCs of the log 910 can be persistently stored on non-volatile storage of storage resources of the cloud service provider environment 310.

In at least one embodiment, a user or client write I/O, such as from the host 320 to the VDS 314 noted above, can more generally be referred to as a transaction where the transaction, such as the write I/O, can be committed to the log 910 during a transaction commit process. As part of committing the transaction, such as the write I/O, to the log 910, in at least one embodiment, a PB-PDESC pair can generally be allocated from the log 910, where the PDESC of the pair is then updated to include information describing the write I/O, and where the PB of the pair is then updated to store the contents written by the write I/O. Generally, the PB storing write data for a corresponding write I/O operation can vary in size in accordance with the amount of write data or size (e.g., in terms of storage units) of the write data. For example, one write I/O can write 4K bytes of data and another write can write 8K bytes of data.

Thus, part of committing the write I/O to the log can include allocating a page buffer (PB) of sufficient size from persistent storage and then storing the write data (written by the write I/O) on the persistent storage of the allocated PB. In at least one embodiment, buffer allocation of PBs can be performed by the PB allocator 316. On a best effort basis, the PB allocator 316 can allocate adjacent PBs for corresponding adjacent PB allocation requests. The adjacent PB allocation requests can be adjacent or sequential and consecutive in terms of times when such requests are made and received by the PB allocator 316. In at least one embodiment, the adjacent PBs allocated can be logically and/or physically adjacent to one another in terms of location within the PB pool. In at least one embodiment, the PB pool can be memory mapped to a portion of non-volatile physical storage media used for the log 910. Memory-mapping is a mechanism that maps the PB pool as stored on the physical storage media to a range of addresses within a process or application's address space. Thus, the PB pool denotes the portion of the non-volatile physical storage of the log used for storing recorded user data of client write I/Os recorded in the log. In such an embodiment, allocating a first PB which is adjacent to a second PB can mean that the first and second PBs are located logically and physically next to one another in a contiguous manner within the PB pool. Thus in at least one embodiment, the first and second PBs can form a contiguous portion located at sequential consecutive offsets within the PB pool.

In at least one embodiment in accordance with the techniques of the present disclosure, rather than directly sending a request to store write data in an allocated PB of the log, the request to store or write the write data persistently in an allocated PB can be queued in the aggregation queue 318. The aggregation queue processing module 320 can perform processing to monitor the aggregation queue 318 and also coalesce and combine queued requests of the aggregation queue 318. In at least one embodiment, the module 320 can monitor requests of the aggregation queue 318, combine multiple requests with adjacent PB offsets into a single consolidated or aggregated request, and then perform an aggregated write of the single consolidated request to the PB pool of the log. In at least one embodiment, it can be expected that requests to store or write data to allocated PBs will arrive at the aggregation queue 318 in nearly the same relative order in which the PBs have been allocated. Thus, it can be expected that requests to store write data in PBs, where such requests are sequential and consecutive in terms of arrival or receipt at the aggregation queue, can be combined most of the time. In at least one embodiment where multiple requests to store write data to multiple adjacent PBs have been combined in a single consolidated write to the PB pool, each individual write I/O or transaction with write data in the single consolidated write to the PB pool will proceed and resume after all the write data of the single consolidated write has been stored in the PB pool of the log.

In at least one embodiment, the PB allocator 316 can preallocate a large partition of storage from the PB pool. The partition can be preallocated prior to the PB allocator receiving a PB allocation request which can be fulfilled using the partition. MAX can denote a maximum aggregation size and can also denote the size of the preallocated partition. Generally in at least one embodiment, the PB allocator 316 can obtain partitions of PB pool storage where each such partition is of the size MAX and each individual partition can denote a contiguous storage portion of the PB pool. As PB allocation requests for new write I/Os to be logged are received by the PB allocator 316, the PB allocator 316 can then allocate corresponding PBs for storing the write data of the write I/Os from a partition of MAX size. Thus, the PB allocator generally obtains a partition denoting a large chunk of contiguous storage from the PB pool. Subsequently, the PB allocator can then allocate PBs of one or more requested sizes from the partition, where each of the allocated PBs can generally denote a smaller portion or smaller chunk of the larger partition. In at least one embodiment, for consecutively received allocation requests, the PB allocator 316 can allocate PBs at adjacent offsets or locations in the PB pool such that the adjacent PBs form a contiguous portion of storage of the PB pool located at a range of consecutive offsets in the PB pool.

Figure 9:
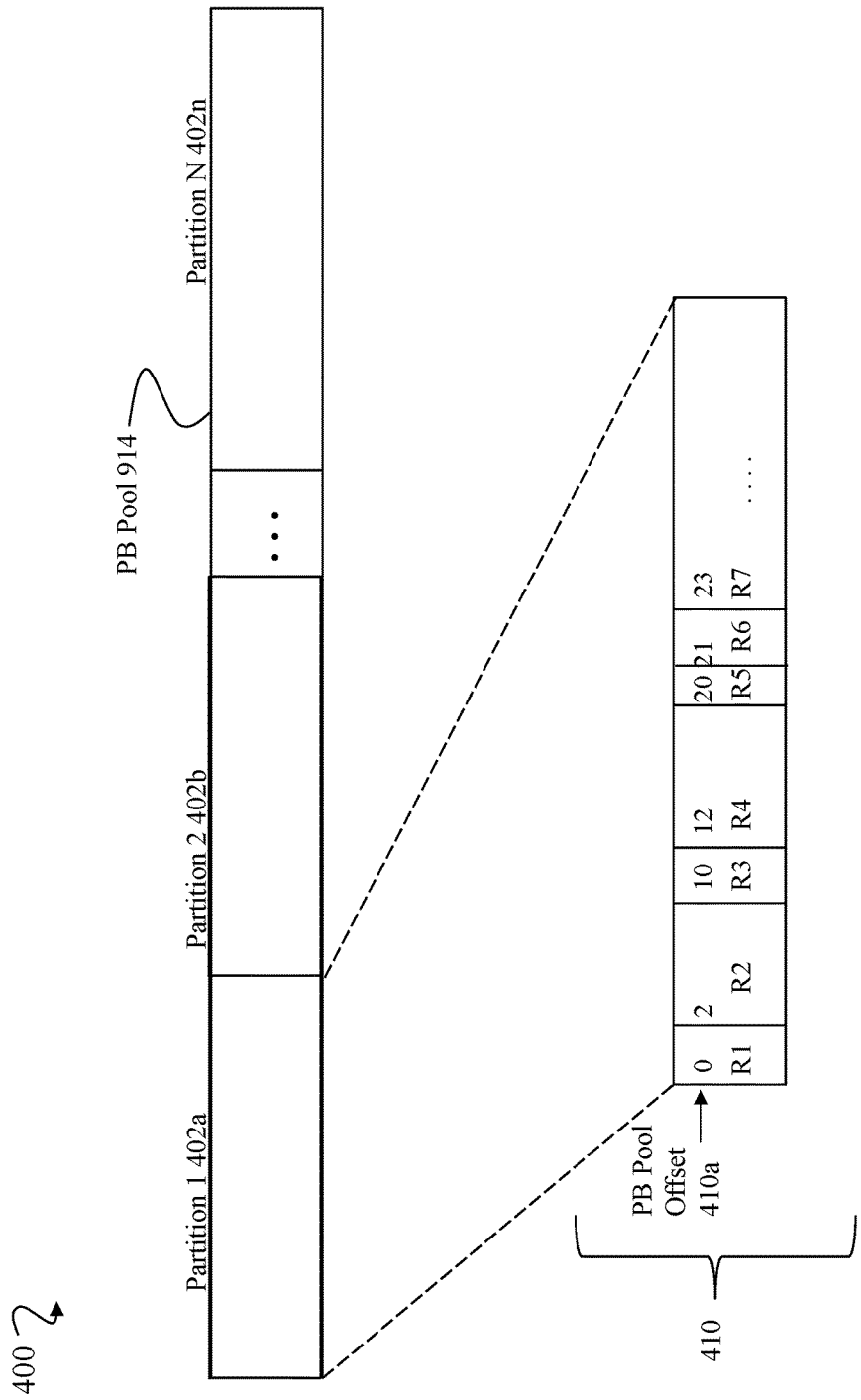
FIG. 9 is an example illustrating allocation of page buffers in at least one embodiment in accordance with the techniques of the present disclosure.

Referring to FIG. 9, shown is an example 400 illustrating the PB pool and PB allocation in at least one embodiment in accordance with the techniques of the present disclosure. The example 400 includes the PB pool 914 which can be configured to include N storage partitions of MAX size. In at least one embodiment, each of the storage partitions can be a contiguous storage portion of MAX size. The example 400 generally illustrates the PB pool 914 including N partitions, 402a-n, where each of the N partitions 402a-n can be of MAX size. In at least one embodiment, although each of the individual partitions 402a-n can denote a contiguous chunk of storage with a contiguous range of offsets in the PB pool, multiple ones of the partitions 402a-n may not denote aggregated contiguously located storage at a contiguous range of offsets in the PB pool. For example assuming that MAX denotes a size corresponding to 100 offset units in the PB pool, the partition 402a can be located at offsets 0-99 in the PB pool and the partition 402b can be located at offsets 1000-1099 in the PB pool.

The PB allocator 316 can pre-allocate a partition of size MAX, such as the partition 402a, from the PB pool 914. The partition 402a can be pre-allocated to the PB allocator 316 prior to the PB allocator 316 receiving any PB allocation requests subsequently fulfilled by allocating a PB from the partition 402a. The element 410 illustrates how the PB allocator can subsequently fulfill PB allocation requests for write I/Os from the preallocated partition 402a in at least one embodiment in accordance with the techniques of the present disclosure. The element 410a denotes the PB pool offsets in the PB pool 914 associated with corresponding PB allocation requests R1-R7 discussed below. In this example 400, the partition 402a can be located with a starting offset of 0 within the PB pool 914 for illustration purposes. The offset can generally be an integer value denoting a relative offset or location within the PB pool 914. The offset can denote a number of any suitable storage unit that can vary with embodiment (e.g., each PB pool offset unit can correspond to any suitable storage unit).

At a first point in time T1, the PB allocator can request and preallocate the partition 402a from the PB pool. At a second point in time T2 subsequent to T1, a thread or process P1 servicing a first write I/O can issue a first PB allocation request R1 for 2 units of storage from the PB pool. In response, the PB allocator can allocate a PB denoted by R1 located at offsets 0 and 1 in the partition 402a of the PB pool.

At a third point in time T3 subsequent to T2, a thread or process P2 servicing a second write I/O can issue a second PB allocation request R2 for 8 units of storage from the PB pool. In response, the PB allocator can allocate a PB denoted by R2 located at offsets 2-9 in the partition 402a of the PB pool.

At a fourth point in time T4 subsequent to T3, a thread or process P3 servicing a third write I/O can issue a third PB allocation request R3 for 2 units of storage from the PB pool. In response, the PB allocator can allocate a PB denoted by R3 located at offsets 10 and 11 in the partition 402a of the PB pool.

At a fifth point in time T5 subsequent to T4, a thread or process P4 servicing a fourth write I/O can issue a fourth PB allocation request R4 for 8 units of storage from the PB pool.

In response, the PB allocator can allocate a PB denoted by R4 located at offsets 12-19 in the partition 402*a* of the PB pool.

At a sixth point in time T6 subsequent to T5, a thread or process P5 servicing a fifth write I/O can issue a fifth PB allocation request R5 for 1 unit of storage from the PB pool. In response, the PB allocator can allocate a PB denoted by R5 located at offset 20 in the partition 402*a* of the PB pool.

At a seventh point in time T7 subsequent to T6, a thread or process P6 servicing a sixth write I/O can issue a sixth PB allocation request R6 for 2 units of storage from the PB pool. In response, the PB allocator can allocate a PB denoted by R6 located at offsets 21-22 in the partition 402*a* of the PB pool.

At an eighth point in time T8 subsequent to T7, a thread or process P7 servicing a seventh write I/O can issue a seventh PB allocation request R7 for some number of units of storage from the PB pool. In response, the PB allocator can allocate a PB denoted by R7 located at a corresponding number of offsets beginning with the offset 23 in the partition 402*a* of the PB pool.

In a similar manner, the PB allocator can fulfill PB allocation requests by allocating PBs from consecutively located offsets in the partition 402*a*. Once the PB allocator has allocated all the storage in the partition 402*a*, the PB allocator can subsequently request another partition of size MAX from the PB pool 914. In this manner for consecutive PB allocation requests, the PB allocator can allocate adjacent PBs which collectively form a contiguous storage portion of the PB pool.

In some scenarios, it may be that a current partition has an insufficient amount of storage to fulfill an allocation request. For example, assume the partition 402*a* has 100 offset units of storage located at offsets 0 through 99 of the PB pool where PB pool storage at offsets 0-98 has been allocated and where PB pool storage at offset 99 is free. The PB allocator may receive a PB allocation request for 10 units. However, the current partition has only a single free unit of storage located at offset 99. In this case, the PB allocator can use any suitable technique to fulfill the allocation request. For example, in at least one embodiment, the PB allocator can: 1) retain for at most a specified amount of time the remaining single free unit of PB pool storage located at offset 99 to fulfill a subsequent but not yet received request for only a single PB pool storage unit; 2) obtain another partition of size MAX, such as 402*b*, from the PB pool; and 3) allocate the requested PB of size 10 units from the partition 402*b*. In such an embodiment, generally, the PB allocator can return the free single PB pool unit of storage located at offset 99 to the PB pool if, for example, the free storage is not used by the PB allocator within some specified amount of time. At some later point in time, the logged write I/Os having corresponding PDESC-PB pairs with PBs allocated from the partition 402*a* are flushed from the log, and the allocated PBs of the partition 402*a* are freed, reclaimed, and made available for reuse, whereby the PB allocator can once again obtain the partition 402*a* of MAX size from the PB pool for further fulfilling subsequent PB allocation requests.

As another scenario, the PB allocator can allocate storage for a PB where not all allocated storage of the PB is contiguously located within the PB pool. In at least one embodiment, the PB allocator can use best efforts to fulfill a PB allocation request with contiguously located storage of the PB pool. However, it may be that the PB allocator allocates storage for the PB from multiple discontinuous storage chunks of one or more partitions of PB pool storage. For example, assume that partition 402*a* has a size of 100 located at PB pool offsets 0-99 and the PB allocator has allocated storage from offsets 0-98. Now the PB allocator receives a request to allocate a PB having a required size for 4 offsets. The current partition 402*a* has an insufficient amount of free storage so the PB allocator requests and obtains another partition 402*b* of MAX size. Assume that the partition 402*b* begins at PB pool offset 1000. In this case, the PB allocator can fulfill the PB request for 4 units or offsets by allocating a first storage chunk located at PB pool offset 99 (1 offset unit from the partition 402*a*) and allocating a second storage chunk located at PB pool offsets 1000-1002 (3 offset units from the partition 402*b*). In this case, the single transaction corresponding to a single write I/O request can have its write data recorded in the log in a PB represented by two chunks of storage of the PB pool where each of the individual chunks denotes a contiguous PB offset range in the PB pool but where the two chunks are not collectively contiguous in the PB pool.

In connection with the above description a single transaction can correspond to a single write I/O request using a single PB for storing the content written by the single write I/O. More generally in some cases, a single transaction can include one or more write I/O requests. In a case where a single transaction includes multiple write I/Os, the multiple write I/Os can be committed to the log atomically as a unit. With such multiple write I/Os of the single transaction, there can be multiple corresponding PBs for the multiple write I/Os. In such a case, committing the transaction of multiple writes to the log can include writing content to the multiple corresponding PBs of the log where each such PB can generally include one or more storage chunks where each such storage chunk has an individual contiguous offset range in the PB pool.

Figure 10:
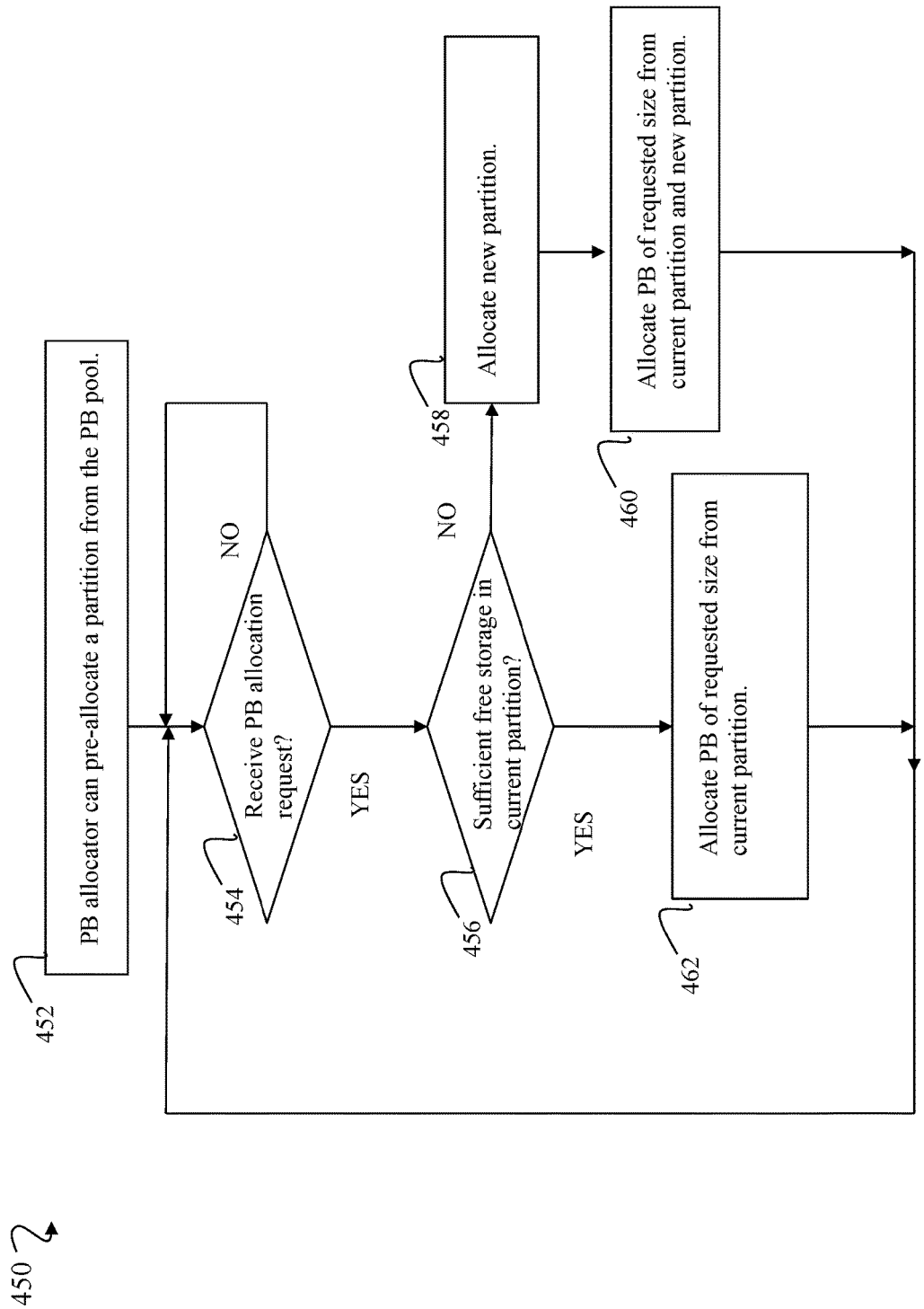
FIGS. 10, 12 and 13 are flowcharts of processing steps that can be performed in at least one embodiment in accordance with the techniques of the present disclosure.

Referring to FIG. 10, shown is a flowchart 450 of processing steps that can be performed by the PB allocator in at least one embodiment in accordance with the techniques of the present disclosure. The steps of FIG. 10 summarize processing described above.

At the step 452, the PB allocator can pre-allocate a partition from the PB pool. The partition can be the current partition. From the step 452, control proceeds to the step 454 where the PB allocator can wait at the step 454 until it receives a PB allocation request. Thus, at the step 454, a determination is made as to whether the PB allocator has received a next PB allocation request for another write I/O operation being logged or recorded in the log. If the step 454 evaluates to no, control remains at the step 454. If the step 454 evaluates to yes, control proceeds to the step 456.

At the step 456, a determination is made as to whether there is sufficient free storage in the current partition. The PB allocation request received can indicate a size denoting an amount of the PB pool storage requested for allocation. If the step 456 evaluates to no, control proceeds to the step 458 where the PB allocator obtains a new partition of size MAX from the PB pool. From the step 458, control proceeds to the step 460 where processing is performed to allocate the PB of the requested size from the current partition and the new partition. In this case, the current partition has been consumed and the new partition can now become the current partition in connection with processing subsequent PB allocation requests. From the step 460 control proceeds to the step 454.

If the step 456 evaluates to yes, control proceeds to the step 462. At the step 462, the PB of the requested size can be allocated from the current partition. As noted above, the PB of the requested size can be allocated from the next consecutive sequential PB pool offset of the current partition so that the current PB allocated in the step 460 is contiguously located in the PB pool with respect to the PB allocated for the immediately prior PB request. In other words, the PB allocator can contiguously locate $PB_J$ and $PB_{J+1}$ within the PB pool, where $PB_J$ is allocated responsive to PB request J, where $PB_{J+1}$ is allocated responsive to PB request J+1 which is a next consecutive request received by the PB allocator immediately after PB request J. Also, K can denote the starting PB pool offset of PBj and L can denote the starting PB pool offset of $PB_{J+1}$, where K<L and where K-L denotes a contiguous range of offsets in the PB pool. From the step 462, control proceeds to the step 454 where the PB allocator can wait to receive the next PB allocation request for processing.

As noted above in at least one embodiment, a single transaction can generally include one or more write I/O requests. In a case where a single transaction includes multiple write I/Os, the multiple write I/Os can be committed to the log atomically as a unit. With such multiple write I/Os of the single transaction, there can be multiple corresponding PBs for the multiple write I/Os. In such a case, committing the transaction of multiple writes to the log can include writing content to the multiple corresponding PBs of the log where each such PB can generally include one or more storage chunks where each such storage chunk has an individual contiguous offset range in the PB pool.

In at least one embodiment, each transaction commit request to commit or write the transaction to the log can include queuing the request (to persistently record the transaction in the log) to the aggregation queue 318. Generally, the aggregation queue can accumulate PBs of multiple write I/Os of multiple transactions into a contiguous segment until either the contiguous segment reaches a maximum size, MAX, or an aggregation time limit is reached. Once either of the foregoing conditions for a contiguous segment is true or reached, the contiguous segment can be persisted to the transaction log. Generally, the aggregation queue can accumulate PBs of multiple transactions into multiple contiguous segments each denoting an individual contiguous range of offsets in the PB pool.

In at least one embodiment, each transaction commit request can arrive at the aggregation queue with a list of PB pool offsets allocated by the PB allocator for the one or more PBs of the transaction. In at least one embodiment, the list can be a scatter-gather list. Processing can be performed to enqueue individual contiguous ranges of PB offsets from the list to the aggregation queue where each such contiguous range can denote a segment. Segments can be maintained in the aggregation queue in sorted order based on their corresponding starting offset in the PB pool. Processing can be performed, such as by the aggregation queue processing module 320, to coalesce existing contiguous segments from the queue with newly enqueued contiguous segments in response to enqueuing the new contiguous segments.

In at least one embodiment, the aggregation queue can be implemented using a sorted segment list and a sorted arrival times list. The sorted segment list can include a sorted list of segment structures where each segment structure can be an entry of the sorted segment list. Each segment structure can denote a contiguous range of PB pool offsets and can be expressed using a starting offset and a size, where the contiguous range is starting offset+size. For example, starting offset=100, size=2, denotes a contiguous inclusive offset range from 100-101, also denoted as [100, 102) and [100, 101]. As known in the art in formal notation for ranges "[" means that the starting point is included in the range, "]" means that the end point is included in the range, "(" means that the starting point is not included in the range, and ")" means that the end point is not included in the range.

For each segment, the corresponding segment structure can identify a list of the transaction IDs (identifiers) of transaction requests having one or more associated offsets in the contiguous range of the segment. In at least one embodiment, the transaction IDs can uniquely identify each transaction where such transaction IDs can be monotonically increasing and assigned to each transaction as received at the data storage system, or virtual data storage system (VDS 314). The transaction ID ordering can denote the time sequence ordering in which transactions are received. The transaction ID of the logged requests or operations denote the time dependent order in which such logged requests or operations are logically applied to the stored user data in order to maintain the data integrity and data content as expected by the host or other clients. The order in which the data is flushed from the log to the maintains the time order requirement or dependency as denoted by the transaction IDs. In at least one embodiment where the transaction includes multiple write I/O operations, the transaction ID can be the same for each of the multiple write I/O operations of the same transaction. The foregoing list of transaction IDs of a corresponding segment can be used to identify the transactions, and thus write I/O s thereof, for which processing resumes or continues after the associated segment is persisted or written to the log. For example, consider a PB allocated to store write data of a write I/O, where the PB has an associated PB pool offset included in a first segment. After the write data of a write I/O is persisted to the PB of the log by persisting or storing content to the first segment, processing for servicing the write I/O can continue on the data path where an acknowledgement for the write I/O can be returned to the host or other client that originated the write I/O.

For each segment, the corresponding segment structure can also identify the earliest arrival or enqueue time of all the requests having an associated offset in the contiguous range of the segment. The earliest arrival time can be used in connection with tracking when an aggregation time limit is reached for a segment. Each transaction commit request queued to the aggregation queue can be assigned an arrival time, such as using a timestamp, denoting when the request was received at the aggregation queue. In at least one embodiment, an amount of elapsed time for each contiguous segment can be tracked having a starting time which is the earliest arrival time for any PBs having corresponding offsets in the segment. The foregoing amount of elapsed time can be used in determining whether a condition has been met to trigger persisting data of the segment to the log. As one of the conditions noted above, when the amount of elapsed time for a segment reaches the aggregation time limit, content of the segment can be persisted to the log.

In at least one embodiment, the aggregation queue can be further implemented using a list of arrival times maintained for the segments included on the segment list. The list of arrival times can include an entry for each segment and can identify the earliest arrival time for the corresponding segment. The list of arrival times can include entries sorted in accordance with earliest arrival times of the segments. The list of arrival times can be traversed periodically to determine what individual segments, if any, have reached or exceeded the aggregation time limit.

In at least one embodiment, the list of segments can be sorted in accordance with their starting offset as noted above. For example, the list of segments can be sorted in increasing order of their starting offset. When a new segment is enqueued into Aggregation Queue, it can be merged with adjacent segments as can be determined using the starting offset and size, or more generally PB pool offset range, of existing segments in the segment list. In this manner, a newly added segment can be merged with one or more existing segments to form a single resultant aggregated segment on the segment list.

The aggregation queue and use thereof in accordance with the techniques of the present disclosure is more fully illustrated in connection with the example described in the following paragraphs.

Figure 11A:
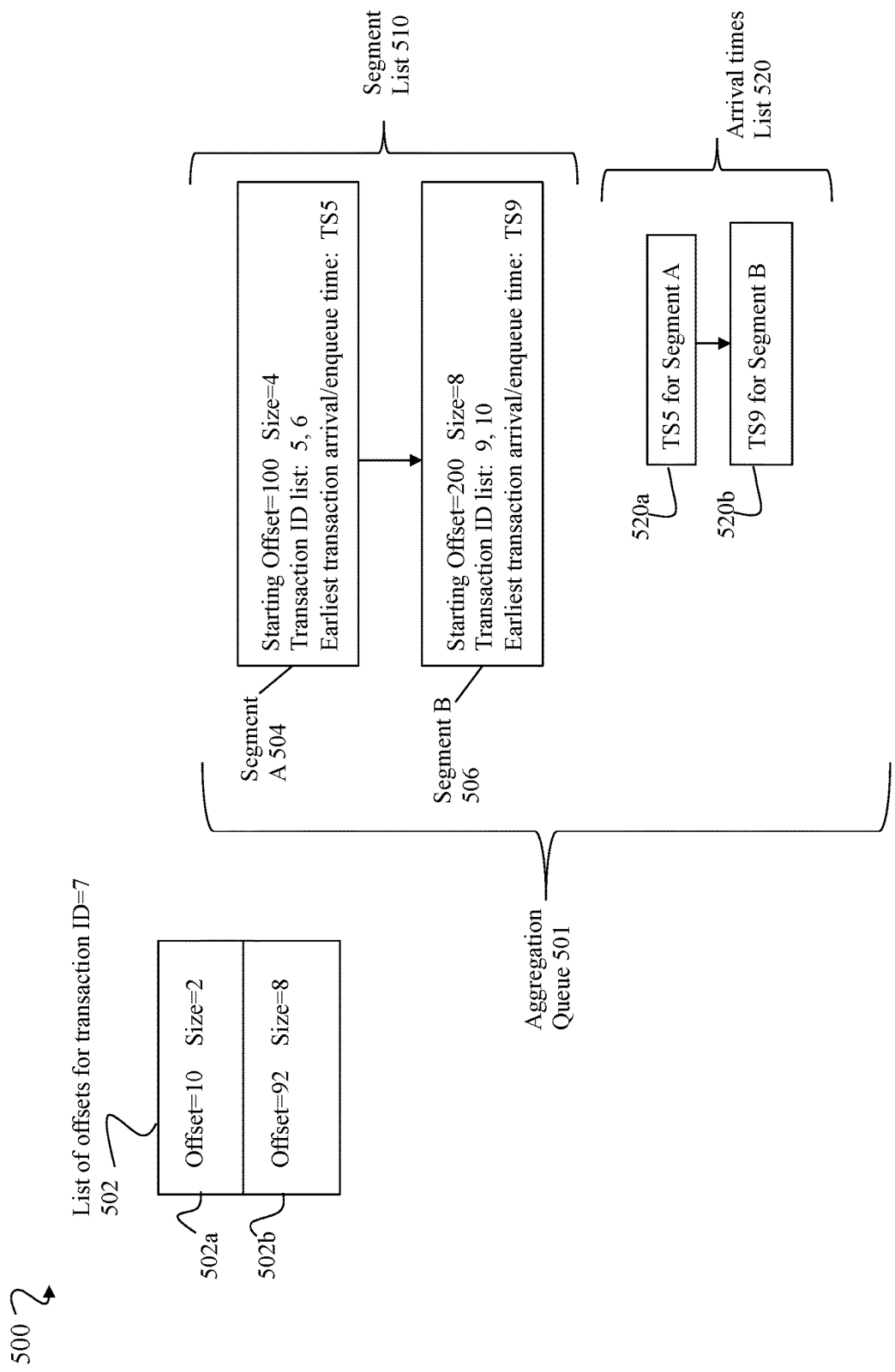
FIGS. 11A and 11B provide an example illustrating use of the aggregation queue in at least one embodiment in accordance with the techniques of the present disclosure.

Referring to FIG. 11A, shown is an example 500 of various structures that can be used in at least one embodiment in accordance with the techniques of the present disclosure. The example 500 can represent structures in the system at a first point in time T10.

The element 502 can denote the list of PB pool offsets for transaction ID 7 which includes a single write I/O where the PB allocated for storing the write data is located at the offsets 10-11 (entry 502a) and 92-99 (entry 502b) of the PB pool. The transaction ID 7 denoted by the list 502 can be enqueued or added to the aggregation queue at the time T10.

In at least one embodiment, the aggregation queue 501 can be implemented using the sorted segment list 510 and the arrival times list 520.

The element 510 can denote the segment list at the time T10 where there are two contiguous segments of contiguous PB pool offsets. The two segments of the list 510 can be represented by the structures 504 and 506. The structure 504 describes a first segment, referred to as segment A for discussion herein, having associated offsets in the contiguous range of 100-103, inclusively, and where the contiguous range of 100-103 denotes the offsets of PBs allocated for write I/Os of transaction IDs 5 and 6. Additionally, the structure 504 indicates that TS5 is the earliest timestamp associated transaction arrival or enqueue time with respect to the transactions IDs 5 and 6 of the segment 504. For purposes of illustration, each transaction ID can have an associated time stamp "TS ID" denoting the time when the transaction ID was queued or arrived at the aggregation queue. In the segment 504, TS5 corresponds to transaction ID 5 which has the earliest transaction arrival or enqueue time with respect to the aggregation queue.

The structure 506 describes a second segment, referred to as segment B for discussion herein, having associated offsets in the contiguous range of 200-207, inclusively, and where the contiguous range of 200-207 denotes the offsets of PBs allocated for write I/Os of transaction IDs 9 and 10. Additionally, the structure 506 indicates that TS9 is the earliest timestamp associated transaction arrival or enqueue time with respect to the transactions IDs 9 and 10 of the segment 506.

The segment list 510 can be sorted in increasing order of starting offset of each of the segments 504 and 506. Thus, for example, the segment A 504 has a starting offset of 100 and the segment B 506 has a starting offset of 200.

The element 520 can denote an arrival time list with one entry or element for each segment on the segment list 510. For example, the entry 520a corresponds to the segment A 504 and indicates that the segment 504 has an earliest transaction arrival time or enqueue time of TS5, and the entry 520b corresponds to the segment B 506 and indicates that the segment 506 has an earliest transaction arrival time or enqueue time of TS9. The entries in the list 520 can be sorted in increasing time order based on the earliest transaction arrival time or enqueue time for each segment. For example, assume TS5 occurs in time prior to TS9 (e.g., TS5<TS9) so that the entry 520a appears in the list prior to the entry 520b.

At the time T10, the request to commit the transaction ID 7 list 502 to the log can be received at the aggregation queue 501. Based on the notation, TS7 can denote the time stamp of when transaction ID 7 with the list 502 arrives and is enqueued to the aggregation queue 501. Accordingly, TS7 also denotes the time T10. Processing can be performed, such as by the module 320, to add or integrate the list of offsets 502 into the aggregation queue 501, and in particular, into the structures 510, 520.

Figure 11B:
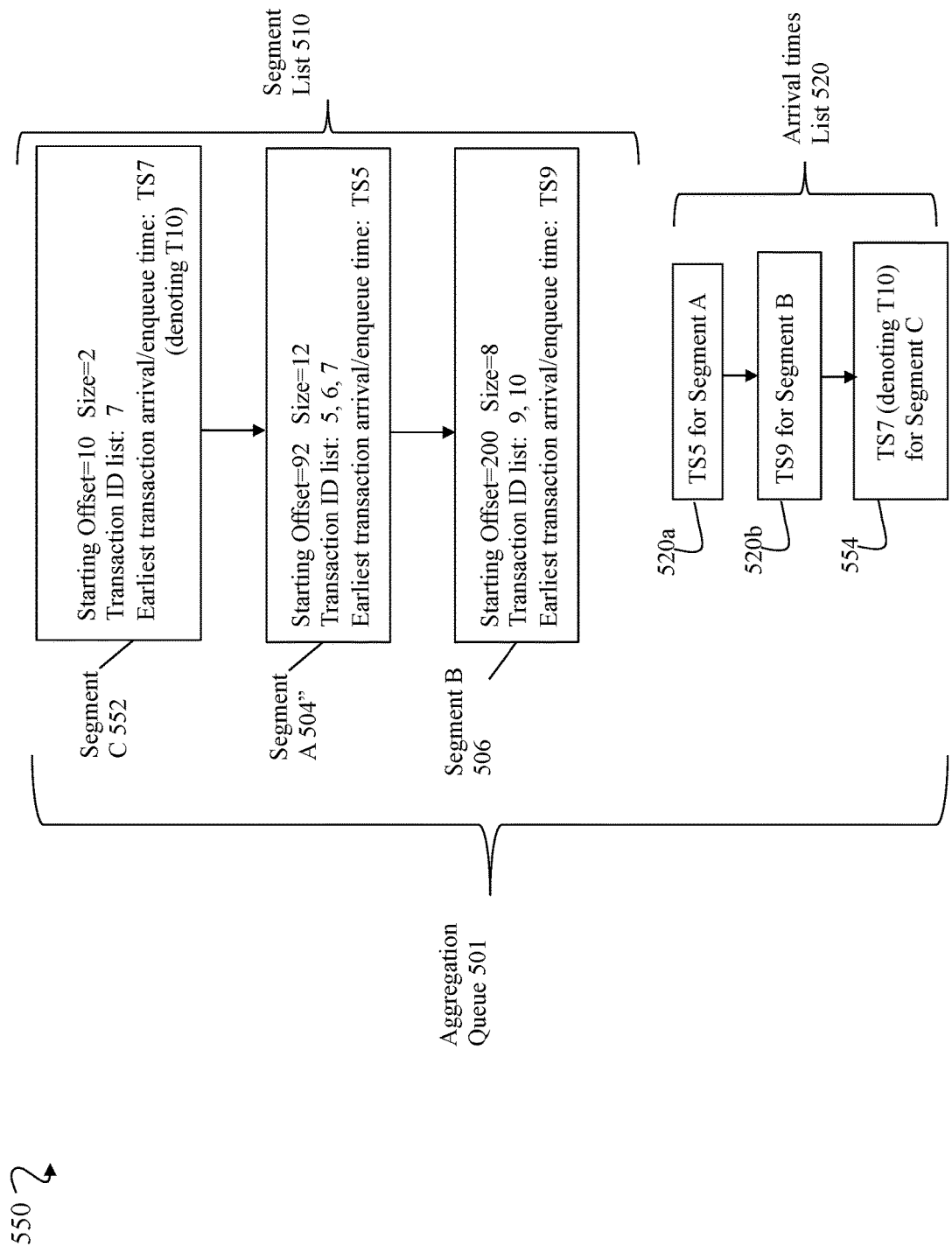

For the entry 502a, processing can traverse the segment list 510 to determine whether the contiguous range of offsets 10-11 of 502a can be merged or combined with an existing contiguous segment of the segment list to form a single larger contiguous segment. This can be determined by examining the starting offset and size of each of the segments 504 and 506. As noted above, the segment A 504 has an associated offset range of 100-103 and the segment B 506 has an associated offset range of 200-207. Processing can determine that the entry 502a does not denote an offset range that can be merged with any other existing segment 504, 506. Accordingly, as illustrated in FIG. 11B, a new segment C 552 can be added to the segment list 510. As illustrated in the example 550 of FIG. 11b, the segment C 552 can correspond to the individual contiguous segment denoted by the offset range of 502a. In particular, the segment 552 has a starting offset of 10 and a size of 2 denoting an offset range of 10-11. The segment 552 indicates that the associated offset range includes PB pool offsets corresponding to transaction ID 7 with an earliest arrival or enqueue time of TS7 (e.g., T10). Additionally, for the newly added segment 552, the entry 554 can be added to the arrival times list 520. In this case, the time denoted by TS7 of the entry 554 is the latest or most recent earliest transaction arrival time of the segments 552, 504" and 506 where the entry 554 can be located last on the arrival times list 520.

For the entry 502b, processing can traverse the segment list 510 to determine whether the contiguous range of offsets 92-99 of 502b can be merged or combined with an existing contiguous segment of the segment list to form a single larger contiguous segment. This can be determined by examining the starting offset and size of each of the segments 504 and 506. As noted above, the segment A 504 has an associated offset range of 100-103 and the segment B 506 has an associated offset range of 200-207. Processing can determine that the entry 502b denotes an offset range that can be merged with the existing segment 504. Thus, the offset range of the segment denoted by the entry 502b is adjacent to the offset range denoted by the segment 504. Accordingly, as illustrated in FIG. 11B, a single merged larger contiguous segment 504" can be formed by the contiguous adjacent segments 502b and 504. In particular, the segment A 504 of FIG. 11A can be updated to the merged larger contiguous segment 504" having a starting offset of 92 and a size of 12 thereby denoting a contiguous offset range of 92-103. The transaction ID list of 504 can be updated to add transaction ID7 to the list transactions having associated PB offsets included in the contiguous offset range of the segment.

Thus, the example 550 of FIG. 11B represents the aggregation queue 501 after adding the list of offsets 502 for transaction ID 7 to the aggregation queue and integrating the list of offsets 502 into the aggregation queue 501.

It should be noted that the segment list 510 can be further processed after adding or integrating entries of the new request 502 into the aggregation queue to determine whether segments of the segment list can be further combined.

The foregoing can be repeated for multiple subsequent transactions of write I/O operations to accumulate PBs of the transactions into contiguous segments of the aggregation queue until, for a contiguous segment of the aggregation queue, the size of the contiguous segment reaches MAX denoting the maximum aggregation size or until the amount of time elapsed from the earliest transaction arrival or enqueue time for the contiguous segment reaches the aggregation time limit. To further illustrate, assume that time elapses to a time T11 subsequent to the time T10 so that no new transactions requests are added or enqueued to the aggregation queue between the times T10 and T11. In this case, the arrival times list 520 can be examined at the time T11 to determine whether the amount of elapsed time from the earliest transaction arrival time of any of the segments has reached or exceeded the aggregation time limit. For example, assume that processing determines that the amount of elapsed time starting from the time TS5 for segment A (denoted by the element 520a) has reached the aggregation time limit even though the size denoted by the contiguous offset range of 504" has not reached the MAX size denoting the maximum aggregation size. In this case, write data or content stored at offsets in the contiguous offset range of 504" (e.g., the offset range 92-103) can be persistently stored to the PB pool of the log. In at least one embodiment where the PB pool is implemented using mapped memory, the write data or content can be stored in the PB pool at the offset range 92-103 and then a request can be issued to persist the content of the PB pool at the offset range 92-103 to non-volatile storage mapped to the PB pool.

To further illustrate, assume that time further elapses to a time T12 subsequent to the time T11 where additional new transactions requests are added or enqueued to the aggregation queue between the times T11 and T12. In particular, assume that such new transaction requests result in the segment C 552 increasing in size to reach the MAX size denoting the maximum aggregation size. However, at the time T12, assume that the elapsed time for segment C 552 (measured from the earliest transaction arrival or enqueue time TS7) does not exceed the aggregation time limit. Thus, at the time T12 for the segment C552, processing can determined that the amount of elapsed time starting from the time TS7 for segment C (denoted by the element 554) has not reached the aggregation time limit but the size denoted by the contiguous offset range of 552 has reached the MAX size denoting the maximum aggregation size. In this case, write data or content stored at offsets in the contiguous offset range of 552 can be persistently stored to the PB pool of the log.

Figure 12:
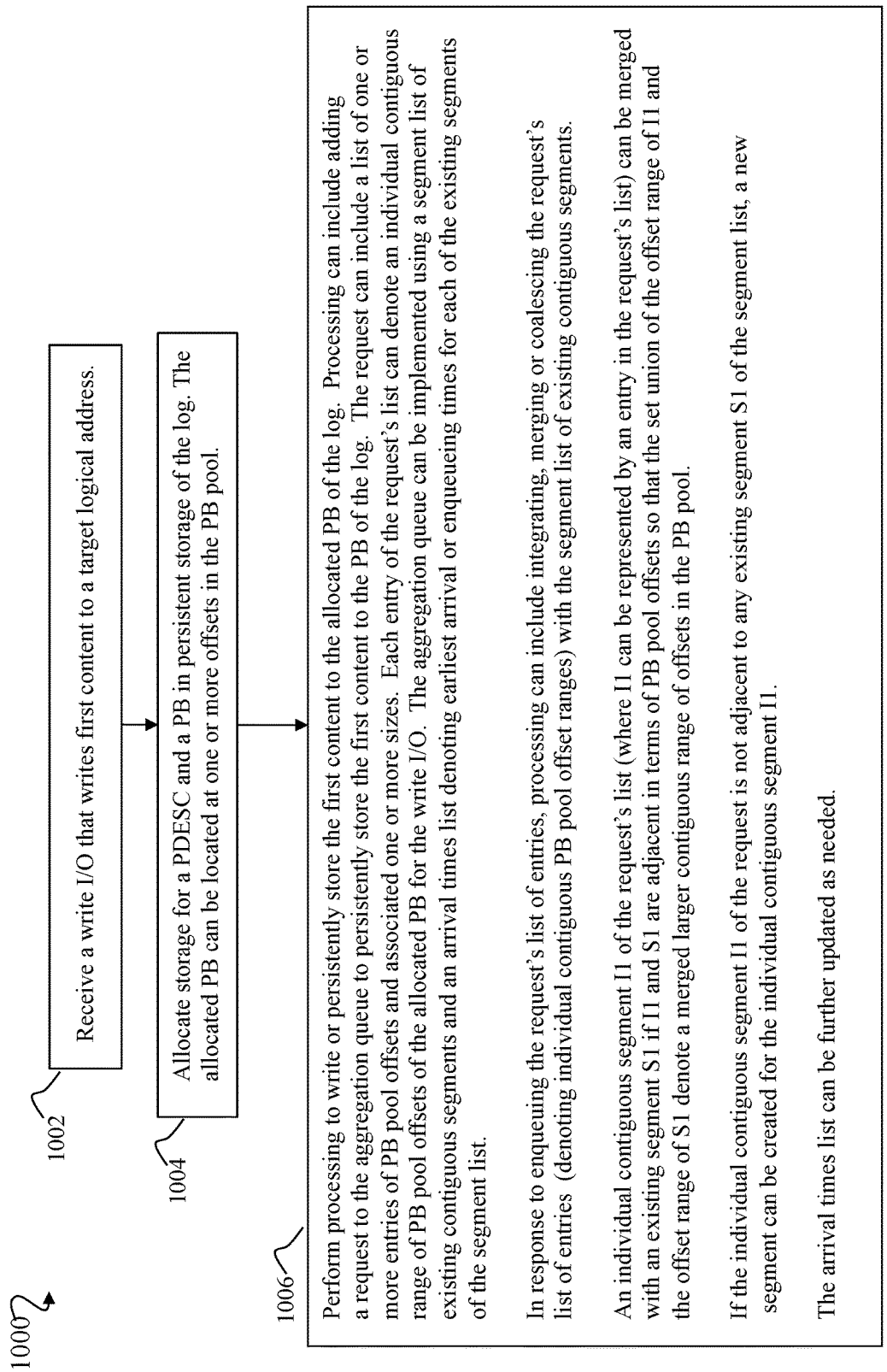

Referring to FIG. 12, shown is a flowchart 1000 of processing steps that can be performed in at least one embodiment in accordance with the techniques of the present disclosure. The flowchart 1000 describes processing that can be performed in connection with logging a write I/O in accordance with the techniques of the present disclosure.

At the step 1002, a write I/O can be received at a VSD 314 where the write I/O writes first content to a target logical address. From the step 1002 control proceeds to the step 1004.

At the step 1004, processing can be performed to allocate storage for a PDESC and a PB in persistent non-volatile storage of the log. The allocated PB can be located at one or more offsets in the PB pool. From the step 1004, control proceeds to the step 1006 to perform processing to record the write I/O in the log using the allocated PDESC-PB pair of the log.

At the step 1006, processing can be performed to write or persistently store the first content to the allocated PB of the log. Processing can include adding a request to the aggregation queue to persistently store the first content to the PB of the log. The request can include a list of one or more entries of PB pool offsets and associated one or more sizes. Each entry of the request's list can denote an individual contiguous range of PB pool offsets of the allocated PB for the write I/O. The aggregation queue can be implemented using a segment list of existing contiguous segments and an arrival times list denoting earliest arrival or enqueuing times for each of the existing segments of the segment list.

In response to enqueuing the request's list of entries, processing of the step 1006 can include integrating, merging or coalescing the request's list of entries (denoting individual contiguous PB pool offset ranges) with the segment list of existing contiguous segments. An individual contiguous segment I1 of the request's list (where I1 can be represented by an entry in the request's list) can be merged with an existing segment S1 if I1 and S1 are adjacent in terms of PB pool offsets so that the set union of the offset range of I1 and the offset range of S1 denote a merged larger contiguous range of offsets in the PB pool. If the individual contiguous segment I1 of the request is not adjacent to any existing segment S1 of the segment list, a new segment can be created for the individual contiguous segment I1. The arrival times list can be further updated as needed in the step 1006.

Figure 13:
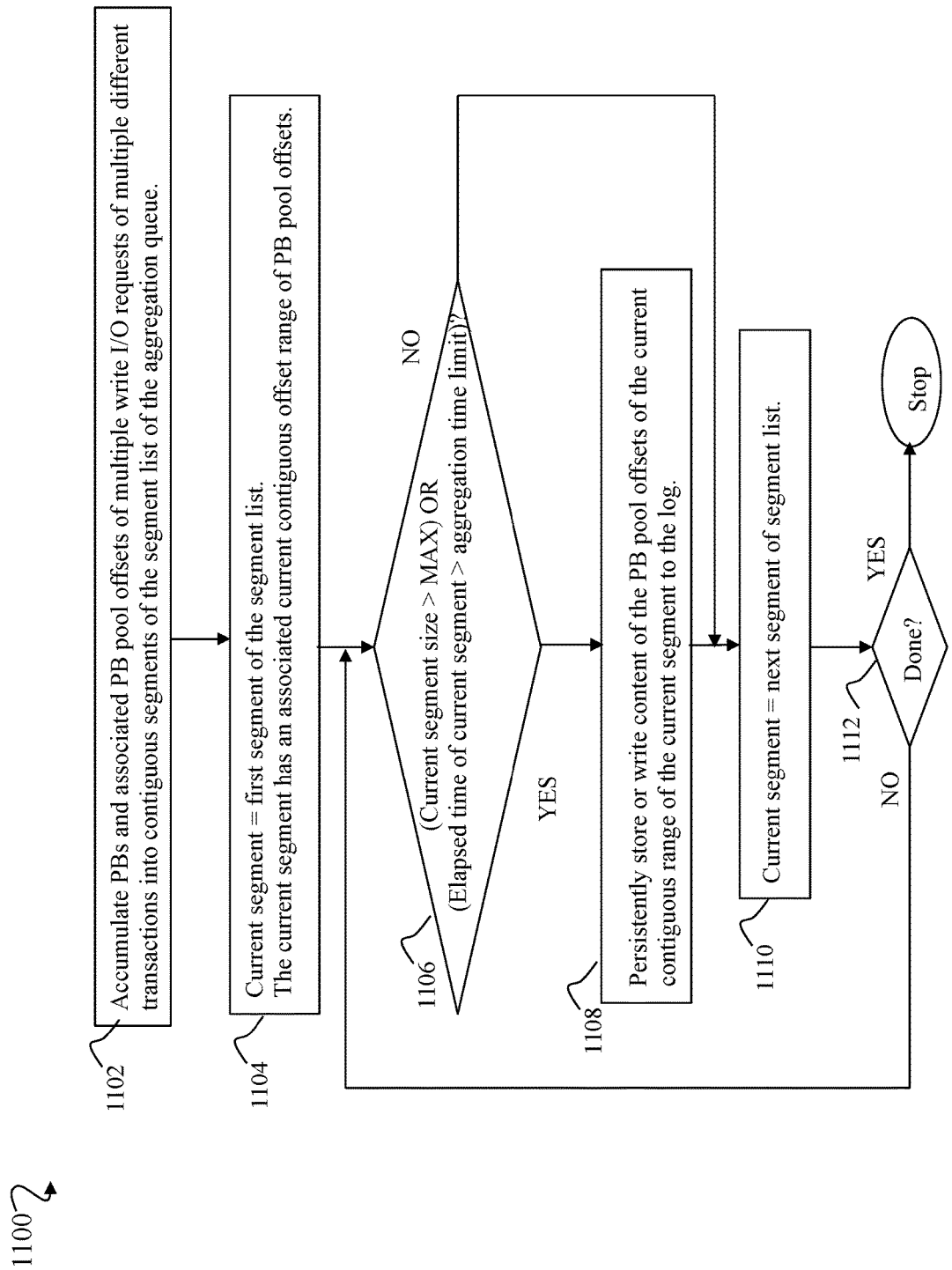

Referring to FIG. 13, shown is a flowchart 1100 of processing steps that can performed in at least one embodiment in accordance with the techniques of the present disclosure. The steps of 1100 can be performed periodically in an ongoing manner in at least one embodiment.

At the step 1102, processing can be performed to accumulate or aggregate PBs and associated PB pool offsets of multiple write I/O requests of multiple different transactions into contiguous segments of the segment list of the aggregation queue. From the step 1102, control proceeds to the step 1104 where processing can be commenced to traverse the list of segments to determine whether to persist or write content of individual segments to the log.

At the step 1104, current segment can be assigned the first segment of the segment list of the aggregation queue. The current segment has an associated current contiguous offset range of PB pool offsets. From the step 1104, control proceeds to the step 1106.

At the step 1106, a determination can be made as to whether the current segment size is larger than MAX, or whether the elapsed time of the current segment exceeds the aggregation time limit. Consistent with other discussion herein, the elapsed time can be measured from a starting point which is the earliest transaction arrival or enqueue time for the current segment. If the step 1106 evaluates to no, control proceeds to the step 1110. Otherwise if the step 1106 evaluates to yes, control proceeds to the step 1108.

At the step 1108, processing can be performed to persistently store or write content of the PB pool offsets of the current contiguous range of the current segment to the log. Processing of the step 1108 can include persistently updating PDESCs associated with the content or write data persistently stored at the PB pool offsets of the current contiguous range. For example, a reference or pointer to an allocated PB can be persistently stored to an associated PDESC of the log. Additionally, after the content of the current segment is persistently stored to the log in the step 1108, associated transactions or write I/Os of the current segment can resume or continue. For example, a first write I/O can write first data that is persistently stored to the log at PB pool offsets of the current segment. Additionally the PDESC for the first write I/O can also be persisted to the log. Servicing of the first write I/O can then continue, for example, to return an acknowledgement to the host or other client which originated the first write I/O. From the step 1108, control proceeds to the step 1110.

At the step 1110, current segment is assigned the next segment in the segment list. From the step 1110 control proceeds to the step 1112.

At the step 1112, a determination is made as to whether all segments in the segment list of the aggregation queue have bee processed. If the step 1112 evaluates to yes, processing stops. Otherwise if the step 1112 evaluates to no, control proceeds to the step 1106 to perform processing for the next current segment of the segment list of the aggregation queue.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
   receiving a write I/O that writes first data to a target logical address; and
   responsive to receiving the write I/O, performing first processing to persistently record the write I/O in a log including:
      allocating storage for a first page buffer (PB) of the log, wherein the first PB is located at one or more offsets in a PB pool of non-volatile storage of the log;
      enqueuing a first request to an aggregation queue, where the first request is a request to persistently store the first data to the first PB of the log, wherein the first request includes information identifying the one or more offsets of the PB pool of non-volatile storage which correspond to the first PB; and
      responsive to said enqueuing, integrating the first request into the aggregation queue, wherein said integrating includes:
         determining whether a first contiguous segment of the one or more offsets of the request is adjacent to a second contiguous segment of offsets of the PB pool, where the second contiguous segment is an existing contiguous segment of the aggregation queue; and
         responsive to determining the first contiguous segment is adjacent to the second contiguous segment, merging the first contiguous segment and the second contiguous segment and generating an aggregated continuous segment.

2. The computer-implemented method of claim 1, wherein said integrating further includes:
   responsive to determining the first contiguous segment is not adjacent to any existing contiguous segment of the aggregation queue, adding the first contiguous segment as a new individual contiguous segment to the aggregation queue.

3. The computer-implemented method of claim 1, wherein the method further includes:
   aggregating allocated PBs and associated PB pool offsets of a plurality of write I/Os into a plurality of contiguous segments of the aggregation queue;
   determining, for a first of the plurality of contiguous segments of the aggregation queue, whether the first contiguous segment has an associated size exceeding a maximum aggregation size, or has an associated elapsed time exceeding an aggregation time limit, wherein the first contiguous segment has a first corresponding contiguous range of offsets in the PB pool; and
   responsive to determining that the first contiguous segment has the associated size exceeding the maximum aggregation size, or has the associated elapsed time exceeding the aggregation time limit, persistently storing content of at least a portion of the plurality of write I/Os having corresponding PB pool offsets included in the first corresponding contiguous range associated with the first contiguous segment.

4. The computer-implemented method of claim 3, wherein the associated elapsed time of the first contiguous segment denotes an amount of time measured from a starting time corresponding to an earliest arrival or enqueue time with respect to the portion of the plurality of write I/Os having corresponding PB pool offsets located in the first contiguous range of offsets in the PB pool.

5. The computer-implemented method of claim 4, wherein the method is performed in a virtualized data storage system (VDS) using software defined storage (SDS).

6. The computer-implemented method of claim 5, wherein the VDS runs in a virtualized environment of a cloud service provider.

7. The computer-implemented method of claim 6, wherein the VDS is SDS that executes on one or more virtual machines (VMs) hosted on servers using resources within an infrastructure of the cloud service provider.

8. The computer-implemented method of claim 7, wherein the VDS receives the write operation from a host, and wherein subsequent to persistently recording the write I/O in the log, the method includes:
   the VDS returning an acknowledgment to the host regarding completion of the write I/O.

9. The computer-implemented method of claim 1, further comprising:
   a PB allocator obtaining a partition of non-volatile storage from the PB pool;
   the PB allocator receiving a first allocation request to allocate storage for the first PB; and
   responsive to receiving the first allocation request, the PB allocator allocating the first PB from the partition.

10. The computer-implemented method of claim 9, wherein the partition is preallocated and obtained by the PB allocator prior to the PB allocator receiving any allocation requests, including the first allocation request, which are fulfilled using the partition.

11. The computer-implemented method of claim 1, wherein the aggregation queue includes a plurality of existing contiguous segments, including the second contiguous segment, and wherein the plurality of existing contiguous segments are sorted in accordance with a plurality of associated starting offsets, wherein each of the plurality of existing contiguous segments has a corresponding one of the plurality of starting offsets denoting a starting offset of a contiguous range of offsets associated with said each existing contiguous segment.

12. The computer-implemented method of claim 11, wherein a first of the plurality of starting offsets and a first size denote a first contiguous range of offsets of the first contiguous segment, and wherein said determining whether the first contiguous segment is adjacent to the second contiguous segment uses the first starting offset and the first size.

13. The computer-implemented method of claim 11, wherein a first of the plurality of existing contiguous segments has an associated contiguous range of offsets of the PB pool, and wherein the associated contiguous range of offsets is associated with a plurality of allocated PBs for a plurality of write I/Os of a plurality of transactions.

14. A system comprising:
one or more processors; and
a memory comprising code stored thereon that, when executed, performs a method comprising:
receiving a write I/O that writes first data to a target logical address; and
responsive to receiving the write I/O, performing first processing to persistently record the write I/O in a log including:
allocating storage for a first page buffer (PB) of the log, wherein the first PB is located at one or more offsets in a PB pool of non-volatile storage of the log;
enqueuing a first request to an aggregation queue, where the first request is a request to persistently store the first data to the first PB of the log, wherein the first request includes information identifying the one or more offsets of the PB pool of non-volatile storage which correspond to the first PB; and
responsive to said enqueuing, integrating the first request into the aggregation queue, wherein said integrating includes:
determining whether a first contiguous segment of the one or more offsets of the request is adjacent to a second contiguous segment of offsets of the PB pool, where the second contiguous segment is an existing contiguous segment of the aggregation queue; and
responsive to determining the first contiguous segment is adjacent to the second contiguous segment, merging the first contiguous segment and the second contiguous segment and generating an aggregated continuous segment.

15. A non-transitory computer readable medium comprising code stored thereon that, when executed, performs a method of comprising:
receiving a write I/O that writes first data to a target logical address; and
responsive to receiving the write I/O, performing first processing to persistently record the write I/O in a log including:
allocating storage for a first page buffer (PB) of the log, wherein the first PB is located at one or more offsets in a PB pool of non-volatile storage of the log;
enqueuing a first request to an aggregation queue, where the first request is a request to persistently store the first data to the first PB of the log, wherein the first request includes information identifying the one or more offsets of the PB pool of non-volatile storage which correspond to the first PB; and
responsive to said enqueuing, integrating the first request into the aggregation queue, wherein said integrating includes:
determining whether a first contiguous segment of the one or more offsets of the request is adjacent to a second contiguous segment of offsets of the PB pool, where the second contiguous segment is an existing contiguous segment of the aggregation queue; and
responsive to determining the first contiguous segment is adjacent to the second contiguous segment, merging the first contiguous segment and the second contiguous segment and generating an aggregated continuous segment.

16. The non-transitory computer readable medium of claim 15, wherein said integrating further includes:
responsive to determining the first contiguous segment is not adjacent to any existing contiguous segment of the aggregation queue, adding the first contiguous segment as a new individual contiguous segment to the aggregation queue.

17. The non-transitory computer readable medium of claim 15, wherein the method further includes:
aggregating allocated PBs and associated PB pool offsets of a plurality of write I/Os into a plurality of contiguous segments of the aggregation queue;
determining, for a first of the plurality of contiguous segments of the aggregation queue, whether the first contiguous segment has an associated size exceeding a maximum aggregation size, or has an associated elapsed time exceeding an aggregation time limit, wherein the first contiguous segment has a first corresponding contiguous range of offsets in the PB pool; and
responsive to determining that the first contiguous segment has the associated size exceeding the maximum aggregation size, or has the associated elapsed time exceeding the aggregation time limit, persistently storing content of at least a portion of the plurality of write I/Os having corresponding PB pool offsets included in the first corresponding contiguous range associated with the first contiguous segment.

18. The non-transitory computer readable medium of claim 17, wherein the associated elapsed time of the first contiguous segment denotes an amount of time measured from a starting time corresponding to an earliest arrival or enqueue time with respect to the portion of the plurality of write I/Os having corresponding PB pool offsets located in the first contiguous range of offsets in the PB pool.

19. The non-transitory computer readable medium of claim 18, wherein the method is performed in a virtualized data storage system (VDS) using software defined storage (SDS).

20. The non-transitory computer readable medium of claim 19, wherein the VDS runs in a virtualized environment of a cloud service provider.

* * * * *